US007240327B2

(12) United States Patent
Singh et al.

(10) Patent No.: US 7,240,327 B2
(45) Date of Patent: Jul. 3, 2007

(54) CROSS-PLATFORM DEVELOPMENT FOR DEVICES WITH HETEROGENEOUS CAPABILITIES

(75) Inventors: Uma Kant Singh, Bangalore (IN); Ankur Bhatt, Bangalore (IN); Pasupathi Sankaran, Bangalore (IN); Raghunandan Sarangarajan, Bangalore (IN); Ramesh Gangadhar Bachiraju, Bangalore (IN); Thomas Arend, Mannheim (DE)

(73) Assignee: SAP AG, Walldorf (DE)

( * ) Notice: Subject to any disclaimer, the term of this patent is extended or adjusted under 35 U.S.C. 154(b) by 561 days.

(21) Appl. No.: 10/455,268

(22) Filed: Jun. 4, 2003

(65) Prior Publication Data

US 2004/0250238 A1 Dec. 9, 2004

(51) Int. Cl.
*G06F 9/44* (2006.01)
(52) U.S. Cl. .................. 717/108; 717/100; 717/116; 709/218
(58) Field of Classification Search ................ 717/100, 717/108, 116; 719/220, 332, 328, 316; 709/217, 709/218; 718/1; 714/26, 38; 715/515, 835, 715/967
See application file for complete search history.

(56) References Cited

U.S. PATENT DOCUMENTS

| | | | | |
|---|---|---|---|---|
| 5,583,983 A | * | 12/1996 | Schmitter | 717/138 |
| 5,815,653 A | * | 9/1998 | You et al. | 714/38 |
| 6,158,045 A | * | 12/2000 | You | 717/124 |
| 6,510,550 B1 | * | 1/2003 | Hightower et al. | 717/108 |
| 6,604,046 B1 | * | 8/2003 | Van Watermulen et al. | 701/208 |
| 6,662,357 B1 | * | 12/2003 | Bowman-Amuah | 717/120 |
| 6,968,541 B1 | * | 11/2005 | Hanson et al. | 717/136 |
| 6,986,148 B2 | * | 1/2006 | Johnson et al. | 719/332 |
| 7,092,703 B1 | * | 8/2006 | Papineau | 455/418 |
| 7,103,355 B2 | * | 9/2006 | Chandnani et al. | 455/418 |
| 7,127,709 B2 | * | 10/2006 | Demsey et al. | 717/148 |
| 2002/0104068 A1 | | 8/2002 | Barrett et al. | |
| 2003/0056195 A1 | | 3/2003 | Hunt et al. | |
| 2003/0074457 A1 | | 4/2003 | Kluth et al. | |

OTHER PUBLICATIONS

Template Software Workflow Template Process Template, Developing a WFT Workflow System, Whoe manual, 1998.*
Template Software Workflow Template Process Template, Using the WFT Development Environment, Whole manual, 1998.*
Getting Results with the Object-Oriented Enterprise Model, James Gale, Jan. 26, 1996, pp. 135-161.*
SNAP Foundation Template, Using the SNAP Development Environment, Template Software, Chapters 1-7, 1997.*

* cited by examiner

*Primary Examiner*—Todd Ingberg
(74) *Attorney, Agent, or Firm*—Kenyon & Kenyon LLP

(57) ABSTRACT

A system for generating software applications for a plurality of heterogeneous computing devices. Each computing device has different capabilities. The system outputs device-specific versions of a software application each tailored to the capabilities of the associated computing device in response to receiving device-independent modeling information characterizing the software application. The system includes a framework, a plurality of object types, a modeling tool, and a plurality of device-specific code generators. The framework defines common services on the computing devices. Each object type has a functional relationship to the common services provided by the framework. The modeling tool defines instances of the plurality of object types based on modeling information received as input, outputting a metadata structure describing the behavior and functionality of a software application. From the metadata, the code generators generate device-specific application code tailored to the capabilities of the associated devices.

14 Claims, 25 Drawing Sheets

FIG. 14

CROSS-PLATFORM DEVELOPMENT FOR DEVICES WITH HETEROGENEOUS CAPABILITIES

FIELD OF THE INVENTION

The present invention relates to the areas of information systems and computer software. In particular, the present invention provides a cross-platform development environment for developing business applications for devices possessing heterogeneous capabilities from a single metadata object, which generically characterizes the behavior, functionality and user interface of the application.

BACKGROUND INFORMATION

Information and computer technology comprises an essential component for modern business operations. The utility of computer technology has been enhanced by the coupling of computers with information networks such as the Internet and World Wide Web ("WWW"). Successful business operations in the global marketplace require a synergetic relationship between local and distributed operations. For example, localized operations may include research and development, inventory management, customer service, strategic planning, etc. Distributed operations are conducted, for example, by sales personnel in the field who interact with customers and perform such tasks as order generation, customer relations, customer support, etc. Field personnel utilize mobile devices such as laptop computers for customer information, intake of customer orders, communication with one or more centralized databases at the home office etc. Field personnel demand accurate and timely information regarding the state of business operation in order to effectively perform their jobs. For example, sales personnel typically require up to the minute information regarding current inventory levels, product availability and customer data. Conversely, the enterprise can operate more effectively through centralized management of information regarding the operations of field personnel and information collected in the field.

One model for providing the requisite computing environment involves a plurality of mobile devices operating in an offline mode, which is transparent to the users. That is, the mobile devices run applications in offline mode, yet the user interacts with the mobile applications as if they were running in an online mode. This transparency of operation presents significant challenges both from runtime and development perspectives. In particular, runtime challenges include providing accurate and lossless synchronization of data between a centralized database typically located at the enterprise location and the mobile devices.

Development challenges involve efficiency for rapid creation of applications for a disparate array of mobile devices and platform environments. With conventional systems, it would typically be necessary to develop a separate application for each mobile device. This scenario is highly inefficient since code reuse is not encouraged, therefore requiring significant development time.

Another challenge relates to the fact that mobile users would often desire to utilize smaller footprint devices in the field such as PDAs rather than laptop computers. However, due to the fact that these devices are often limited in processing power and storage capabilities, it becomes impossible to run a full business application on these devices. The advantage of PDA types of devices is their small footprint and weight making these devices ideal for gathering data in the field. Thus, it would be desirable for an offline runtime environment to provide the capability for the use of PDA devices, while preserving the fundamental qualities of the transparency of the offline mode. From the development perspective, it would be desirable for a development environment to provide maximum code reuse and automated generation of applications, which are adapted to the specific properties of particular PDA devices.

SUMMARY OF THE INVENTION

The present invention provides an application development system and method for generating applications for computing devices characterized by heterogeneous capabilities such as processing power, memory, resource, display capability, I/O capability, etc.

Under a development paradigm associated with the application development system, an application at runtime comprises both a framework and associated runtime objects, which operate in tandem as the application executes. The framework provides generic functionality and services for the application. The runtime objects provide customized application-specific functionality, which extend the functionality of the framework and thereby function as meta-code for the application. The runtime objects provide services to the framework allowing customization of an application. The runtime objects effectively extend the generic services provided by the framework.

According to the present invention, the framework is characterized by the definition of several independent runtime layers that communicate with one another through well-defined interfaces. Each runtime layer is customized via particular application-specific code (meta-code), which is embedded in methods and attributes of the various runtime objects. The use of separate layers provides the ability for supporting a myriad of mobile clients (from fat to thin) by varying the application specific code associated with each layer, depending upon the intended platform upon which the application will execute.

According to one embodiment of the present invention, the framework includes a user interface ("UI") layer, a business object layer ("BOL") and a data access layer ("TL"). However, the invention is compatible with any arbitrary framework. Associated with each respective layer are pre-defined object types, which function as modeling entities (development objects) and correspond precisely to the runtime objects to provide application-specific functionality related to the layer. For example, business objects ("BOs") are associated with the BOL. A BO is a modeling entity that attempts to group together properties, methods and event handlers in one group that are associated with actual business entities such as orders, business partners, inventory, etc.

Similarly, UI objects are associated with UI functionality and define the application-specific UI layout and functionality. According to one embodiment, UI objects include tiles, tilesets, business components and an application component. Effectively, tile is a reusable layout of information of some business objects which are very closely related.

According to this same component, transaction objects include an entity referred to herein as a business document ("BDoc").

According to one embodiment, any number of modeling tools provide a graphical user interface ("GUI") for the definition of instance information for pre-defined object types. Among other functionality, the modeling tool provides a graphical user interface for defining instances of pre-defined object types, which have a functional relationship with the framework architecture. As a function of the instance information created in the modeling tool, the modeling tool generates metadata, which is sufficiently generic in its structure to define the application specific functionality completely. Thus, the instance information represents metadata for generation of the application and is sufficiently generic to describe the behavioral, functional and user interface aspects of the application.

For each computing platform on which the application is to run, an application generator is defined. Each application generator is a software process that generates runtime components, which are object code for the runtime objects. According to one embodiment a separate generator is defined for each runtime framework and/or device on which the application is to be executed so that a particular generator produces a software application specifically tailored to execute within the intended framework. Each generator reads the metadata structure and selects a portion of the metadata corresponding to functionality desired to be implemented on the particular computing platform associated with the generator. According to one embodiment, the generator selects the portions of the metadata to use as a function of the capabilities and intended function of the computing device on which the application will execute. The generator then generates at least one runtime component for the associated computing platform as a function of the selected metadata.

According to one embodiment, runtime files of the executable application include runtime components generated by the generator, which provide the object code for the runtime objects as well as object code for the framework. According to one embodiment of the present invention, the framework object code is dynamically linked to the runtime components.

According to one embodiment of the present invention, the heterogeneous computing devices include a first and second computing device, which are characterized by asymmetrical processing, memory and/or resource capabilities. In particular, the first computing device offers greater computational power than the second computing device. However, the second computing device may offer superior portability compared with the first computing device and is thus more desirable for use in the field. In this sense, the second computing device functions as a "companion" to the first computing device. According to one embodiment, the first computing device may be a general mobile device such as a laptop device, while the companion device may be a computing device possessing limited processing capabilities such as a PDA or mobile telephone A particular embodiment envisions a computing environment wherein both the mobile device and the associated companion device operate in tandem according to well defined roles. The PDA device functions primarily as a data aggregation device, and thus is freed from processing intensive demands such as data validation. The companion application does not include those routines associated with the processor intensive functions such as data validation. The mobile device application however does include the necessary processor intensive routines for performing such tasks as data validation and thus the business object layer on that device is not extended to include these services. A synchronization process is provided for directly inputting business object instance information collected on the PDA to the business object layer of the companion device, which has been extended to include the processor intensive routines such as data validation. The received instance information from the PDA is then processed by the business object layer of the mobile device transparently as if it were directly created on the mobile device.

A first generator is defined for the mobile device and a second generator is defined for the companion device. Using a metadata structure produced by the modeling tools, the mobile device generator generates runtime components for the mobile device. Similarly, using the same metadata structure the companion generator generates runtime components for the PDA. Since the PDA application does not require implementation of processor intensive routines such as data validation, the PDA generator omits those portions of the metadata responsible for these routines in its generation of the runtime components for the PDA.

According to one embodiment of the present invention, PDA generator does not process particular methods associated with business objects in the application, and in particular those methods that pertain to data validation during runtime. Thus, the PDA application does not perform data validation during runtime. Namely, the business object layer of the PDA application is not extended to include functionality associated with data validation. However, the synchronization process and architecture is provided that receives instance information for the business objects created during runtime on the PDA and directly transmits this information to the business object layer of the mobile device.

According to this embodiment, an application is generated for both the first computing device and the companion device from a single metadata structure. Respective generators are individually associated with the first computing device and the companion device. Each generator reads the metadata and generates the respective runtime components appropriate for the associated device. The runtime components for the companion device will typically include only a limited subset of functionality of the runtime components for the first computing device.

BRIEF DESCRIPTION OF THE DRAWINGS

FIG. 1b shows architecture for a software development environment according to one embodiment of the invention utilizing the design paradigm shown in FIG. 1a.

FIG. 14 depicts the structure of metadata produced by a modeling tool according to one embodiment of the present invention.

DETAILED DESCRIPTION

The present invention provides a method and system for generation of a first and second software application for execution respectively on a mobile device and an associated companion from a single metadata structure.

Figure 1A:
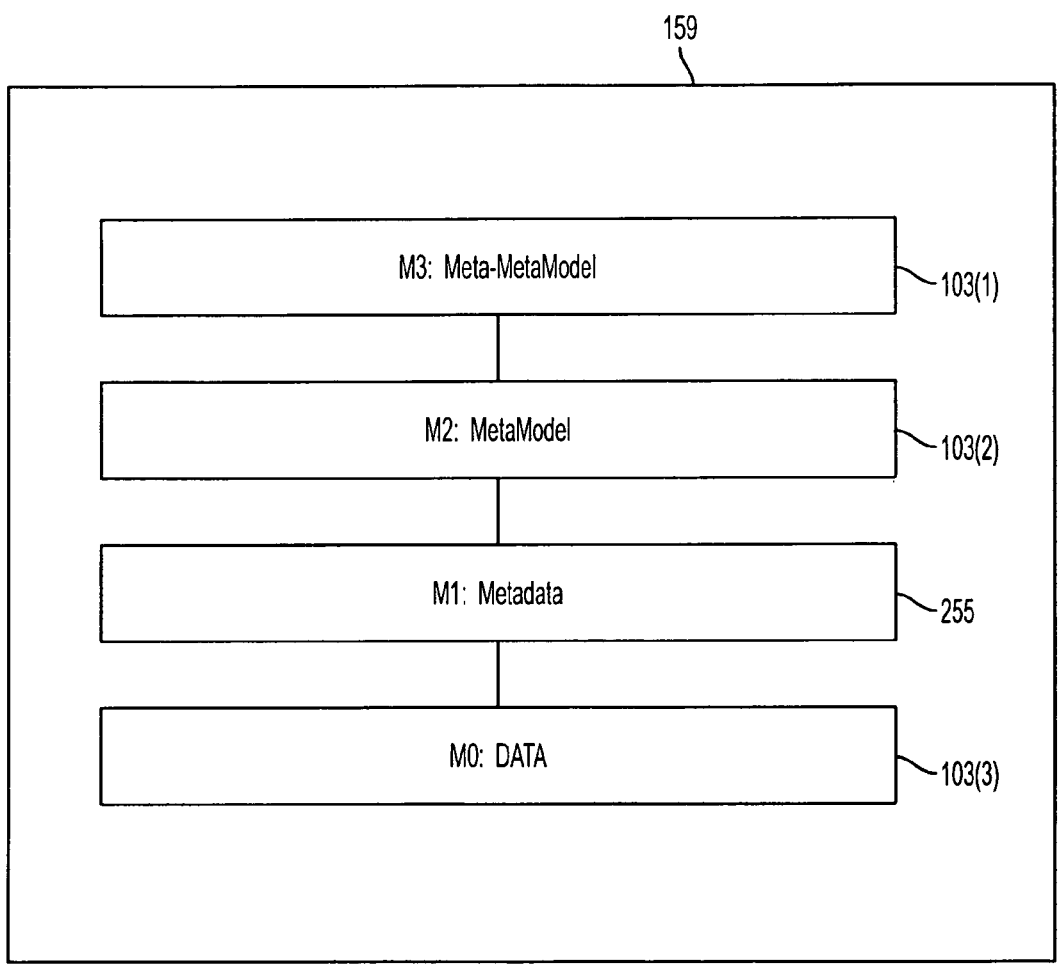
FIG. 1a depicts an application design paradigm according to one embodiment of the invention.

FIG. 1*a* depicts an application design paradigm according to one embodiment of the invention. Design paradigm 159 includes meta-metamodel 103(1), metamodel 103(2), metadata 255 and data 103(3). Meta-metamodel 103(1) provides for modeling a modeling language. Metamodel 103(2) provides for the modeling of object types. Metadata 255 comprises instances of object types. Data 103(3) comprises application data generated at runtime.

Figure 1B:
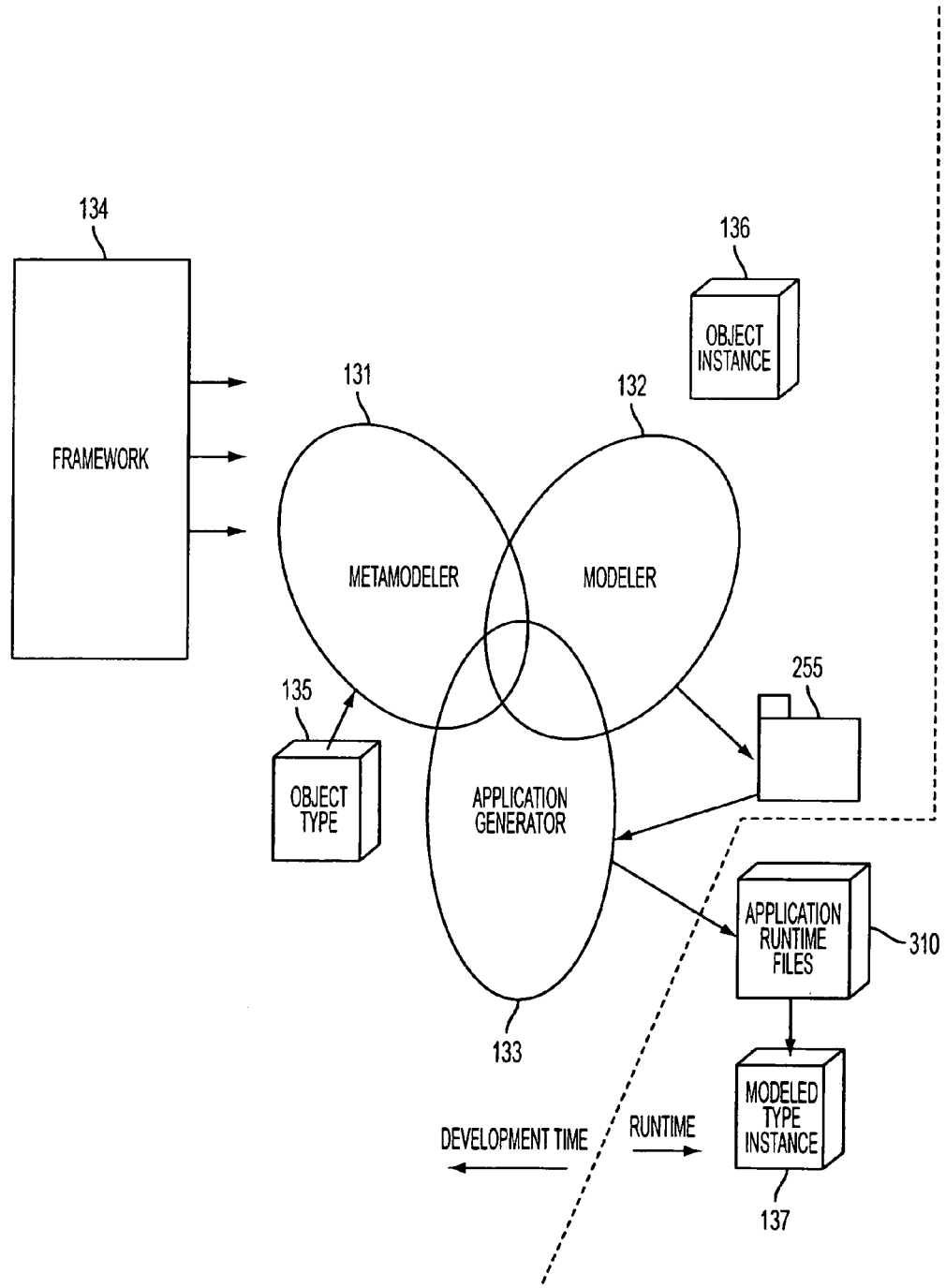

FIG. 1*b* shows an architecture for a software development environment according to one embodiment of the invention utilizing the design paradigm shown in FIG. 1*a*. Framework 134 is a runtime software environment. Framework 134 provides basic functionality common to any software application such as low level data flow, event handling, etc. Framework 134 provides common services to be provided to applications running under the framework. The structure and function of framework 134 will become evident as the invention is further described. However, the present invention may support any framework and is thus adaptable to accommodate future architectural changes.

Although a common framework 134 forms the basic architecture of any software application, in certain cases the framework may be modified to accommodate the particular capabilities and functional role of a device. For some devices having limited processing and memory capabilities such as PDAs, it may be desirable to provide a framework that includes only a subset of functionality of that of a device with greater processing power. In addition, the functional role of a companion device such as a PDA is typically to provide an input mechanism for data. Since typically this data will be synchronized with a second computing device such as a laptop, it is not necessary or desirable to map the received input data to a relational database and it may be more efficient to store the input data in object form. For example, typically a PDA does not have large memory capacity and therefore does not support a large relational database structure. In this example, it might be desirable to store data entered on that device in object form rather than map the input data to a relational database on the PDA.

Thus, although framework 134 provides a common architecture for all target devices, a framework 134 may be modified to adapt to the capabilities or functional role of a device on which the framework 134 is designed to reside.

Metamodeler 131 provides a development tool for specifying any number of object types. Examples of object types 135 will be described as the invention is further explained. Typically there is a close relationship between framework 134 and the particular object types 135 that are defined via metamodeler 131. Thus, according to one embodiment utilizing a framework with a user interface layer, business object layer and interaction layer, metamodeler allows definition of user interface type objects, interaction objects and other object types relating to the corresponding layers in the framework 134. Thus, the object types 135 defined via metamodeler 131 may correspond to particular runtime entities, which comprise framework 134.

Modeler 132 is a modeling tool for specifying the generic behavior and structure of an application. In particular, modeler 132 provides functionality for specifying instances of predefined object types 135 defined in metamodeler 131. An application is specified via modeler 132 by modeling instances 136 of object types 135 comprising an application. According to one embodiment, instances 136 of object types 135 include attributes and functional behavior of that object instance within an application. Using object instances 136, modeler 132 generates metadata 255, which generically specifies the behavior of the application. The structure and function of metadata will be described below.

Application generator 133 parses metadata 255 to generate application runtime files 310. According to one embodiment of the present invention, application generator 133 generates application runtime files 310 for a specific platform having particular capabilities. The structure of application runtime files 310 will be described below with respect to FIG. 3.

Figure 2A:
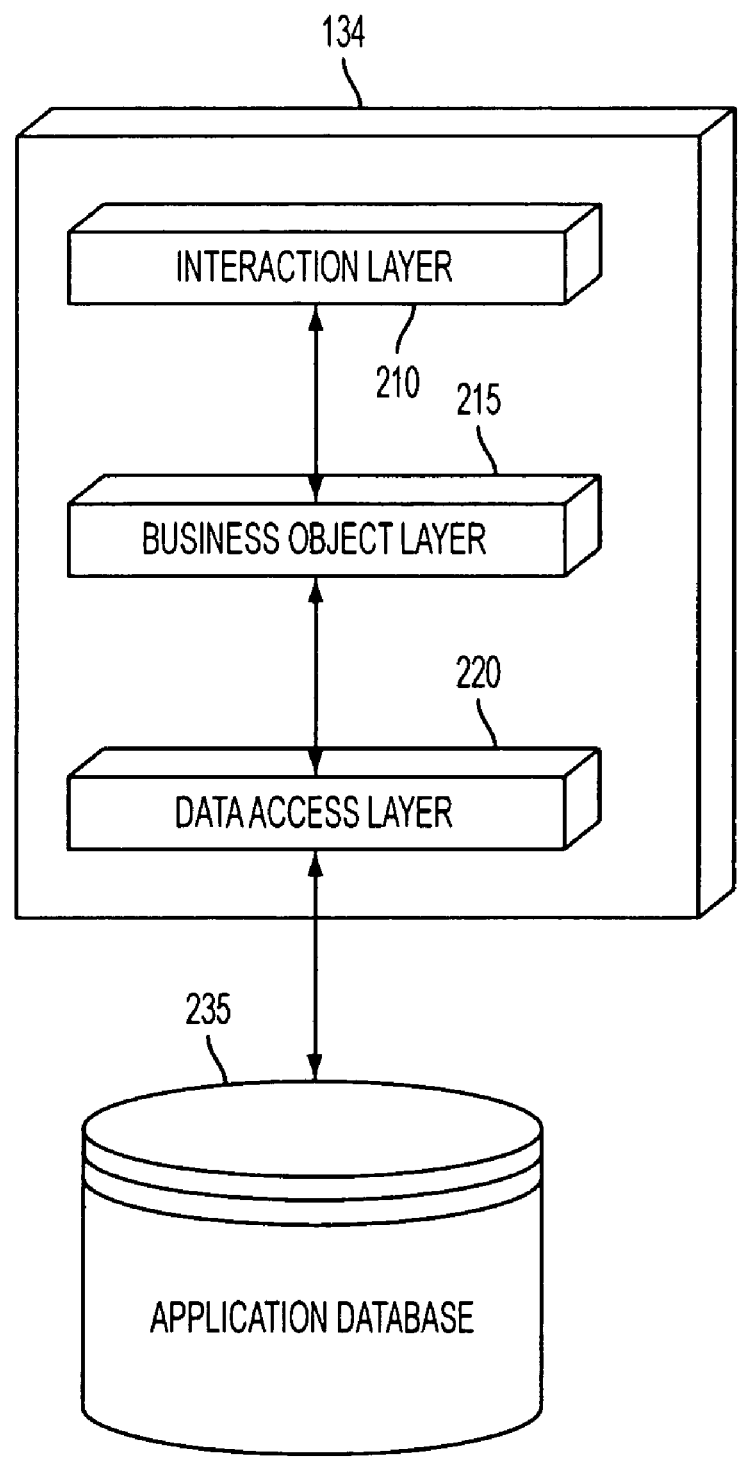
FIG. 2a depicts an architectural view of an offline application runtime framework according to one embodiment of the present invention.

FIG. 2*a* depicts an architectural view of an offline application runtime framework according to one embodiment of the present invention. Framework 134 includes user interface layer 205, interaction layer 210, business object layer 215 and data access layer 220. The function of layers 205, 210, 215 and 220 will become evident as the invention is further described. However, in general, the framework layers provide for separation and modularization of functionalities and services of a software application. These functionalities are integrated into a single application via common interfaces that allow data to be exchanged between any two layers. For example, business object layer 215, which is used in part to define the functionality, structure and logic of an application, exists independently from user interface layer 205, which provides functionality for displaying a user interface to the user. Since different devices have varying degrees of capabilities with respect to the various functionalities associated with the framework layers, framework allows for flexible adaptation of a software application to accommodate the capabilities of various devices.

User interface layer 205 provides functionality for presenting a mobile user with a graphical user interface ("GUI"). For example, according to one embodiment, user interface layer may include a plurality of HTML ("Hypertext Markup Language") or XML ("Extensible Markup Language") pages, which are fetched via a browser resident on the mobile device and presented to the mobile user. Or, in the case of a PDA running Windows CE which typically employs embedded Visual Basic, user interface layer 205 may include a plurality of visual basic forms. As described in detail below, the modeler 132 allows the developer to create and define a user interface for an application. As described in detail below, according to one embodiment, modeler 132 allows the developer to create and define a user interface for an application via certain development time objects, referred to herein as tiles, tile sets and business components.

Interaction layer 210 provides functionality for responding to interactions conducted by the mobile user with the user interface layer 205. For example, interaction layer 210 may include logic for performing certain functions based upon a user clicking a particular portion of a GUI.

Business object layer 215 includes functionality for the core business logic underlying the application running on the mobile device. According to one embodiment of the present invention, an application is modeled through the definition of business objects, which represent real-world business entities. As described in detail below with (among other places) FIGS. 2*b* and 8*a*–8*c*, business objects 805(1)–805(N) associated with the business object layer 215 provide an abstraction of an underlying relational database such as application database 235 and thereby facilitate development of a business application to include common notions of business entities. Among other functions, business object layer 215 performs validations of data entered by a user and, as discussed further below in connection with FIGS. 2*b*, 2*c*, 2*d*, 2*e*, 15*a*, and 15*b*, instantiates business objects 805(1)–805(N) and executes business rules and methods defined for a business object. As described in detail below, modeler 132 allows a developer to define business objects, business object properties, relations between business objects, business rules (e.g., validation rules), which define the logic relating to particular business objects and business query modeling.

Data access layer 220 provides functionality for interactions with application database 235. As noted above, as business objects represent real world business entities, data access layer 220 provides an interface to relate particular business objects with corresponding tables and fields in application database 235. As described in detail below, the development environment provides a BDoc modeler, which allows the developer to define how the data access layer interacts with application database 235 on the mobile device.

According to one embodiment of the present invention, functionality of interaction layer 210 is combined with that of UI layer 205. Thus, in this embodiment, UI layer performs functions associated with user interaction tasks.

Figure 2B:
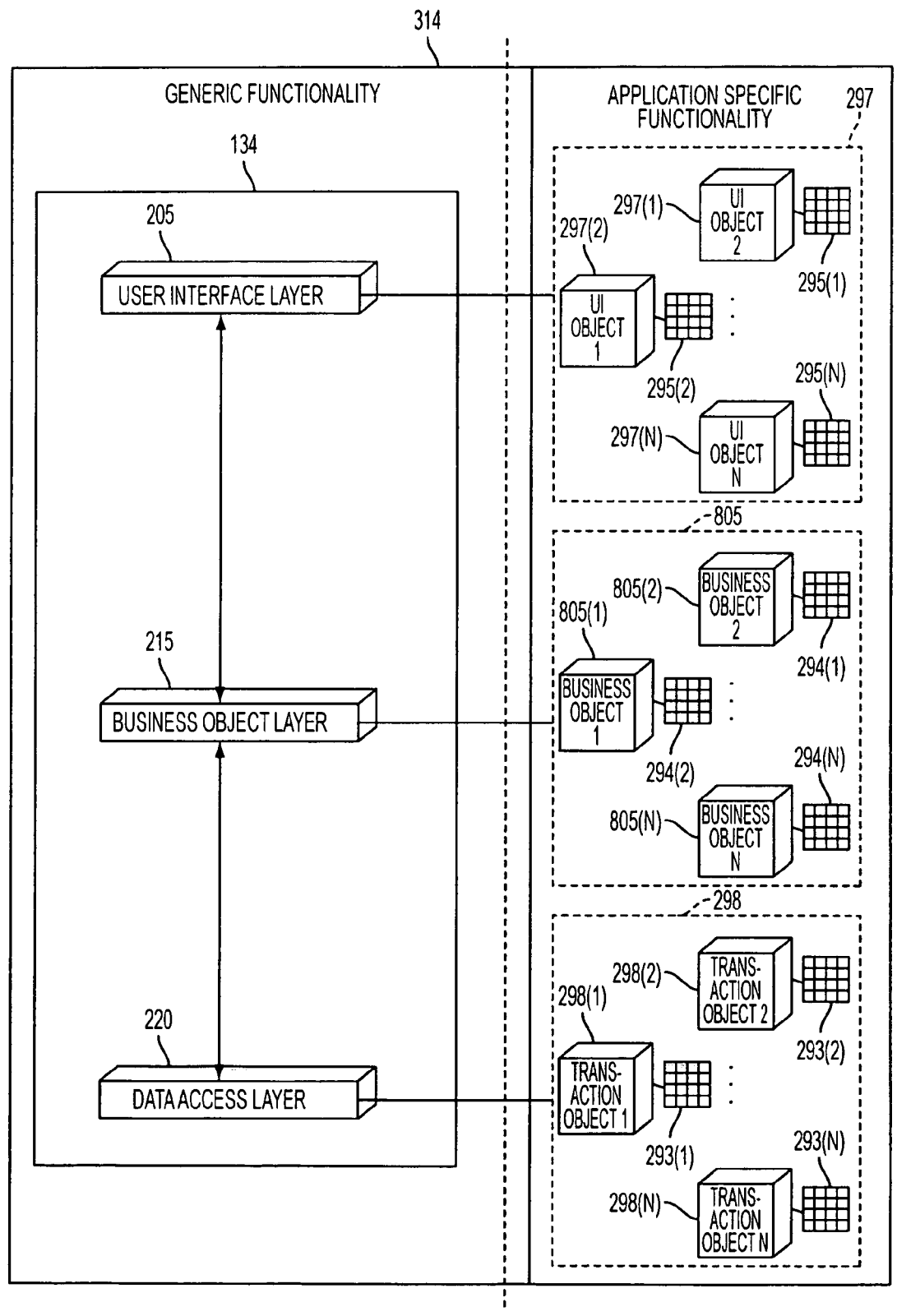
FIG. 2b shows application architecture according to one embodiment of the present invention.

FIG. 2*b* shows an application architecture according to one embodiment of the present invention. The application architecture depicted in FIG. 2*b* allows for a particular development paradigm characterized by the development for heterogeneous computing devices. In particular, note that framework 134 provides generic functionality for application 314, while application specific functionality is provided by objects 297, 805 and 298, which are associated with framework layers 205, 215 and 220 of application 314. As shown, in FIG. 2*b*, each layer of framework 134 is associated with a corresponding set of objects. Thus, UI layer 205 is associated with UI objects 297(1)–297(N), BOL 215 is associated with business objects 805(1)–805(N) and TL 220 is associated with transaction objects 298(1)–298(N). The structure and function of various UI objects 297, business objects 805 and transaction objects 298 will become evident as the invention is further described.

Objects 297(1)–297(N), 805(1)–805(N) and 298(1)–298(N) effectively extend the functionality of each respective associated layer 205, 215 and 220 and thereby serve as meta-code for framework 134. Note, in particular, that UI objects 297(1)–297(N) provide corresponding UI services 295(1)–295(N). Similarly, business objects 805(1)–805(N) provide corresponding business object services 294(1)–294(N), while transaction objects 298(1)–298(N) are respectively associated with transaction services 293(1)–293(N). These services are generated as customizations of the application 314 in a development environment described herein.

Because the functionality of framework layers 205, 215 and 220 are respectively extended via objects 297(1)–297(N), 805(1)–805(N) and 298(1)–298(N) and their corresponding services, applications may be generated for heterogeneous computing devices having varying processing power, resources, etc. This diversity is achieved by varying the application specific functionality that is included in applications commensurate with the capabilities and intended function of the associated computing device on which the application will run.

Figure 2C:
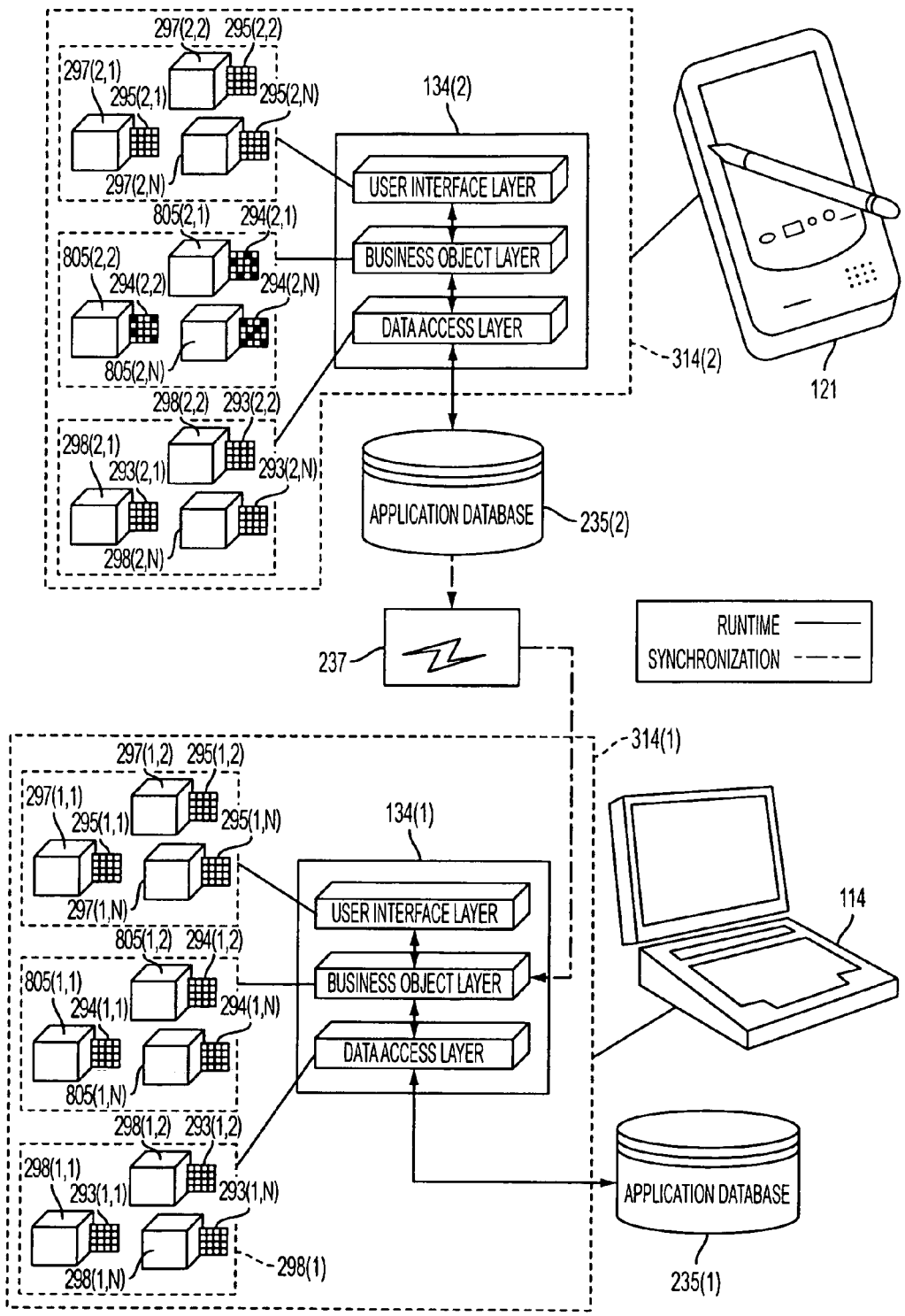
FIG. 2c shows a method for operation of a companion mode between two computing devices.

FIG. 2*c* shows a method for operation of a companion mode between two computing devices. As shown in FIG. 2*c*, mobile device 114 executes application 314(1) comprising framework 134(1), UI objects 297(1,1)–297(1,N), business objects 805(1,1)–805(1,N) and TL objects 298(1,1)–298(1,N). Note that each object has a respective set of associated services 293(1,1)–293(1,N), 294(1,1)–294(1,N) and 295(1,1)–295(1,N). Similarly, companion device 121 executes application 314(2) comprising framework 134(2), UI objects 297(2,1)–297(2,N), business objects 805(2,1)–805(2,N) and TL objects 298(2,1)–298(2,N). Note that each object has a respective set of associated services 293(2,1)–293(2,N), 294(2,1)–294(2,N) and 295(2,1)–295(2,N).

Note, as depicted in FIG. 2*c*, that in comparison with mobile device 114, some services associated with business objects 805(2,1)–805(2,N) on companion device 121 are absent (indicated by solid black squares). These services may be absent due to the fact that companion device 121 has limited processing power, and thus these services would be too cumbersome for execution on companion device 121. Or, possibly, the services not present on companion device 121 are not required for the intended use of companion device 121 in the field.

As shown in FIG. 2*c*, during runtime, respective applications 314(1) and 314(2) on mobile device 114 and companion device operate individually using the generic functionality provided by respective framework 134(1) and 134(2) and application specific functionality provided via the respective UI objects, business objects and TL objects.

Note, as discussed above, application 314(2) running on PDA 121 has only a subset of services available to the business objects 805(2,1)–805(2,N) compared with the business objects 805(1,1)–805(1,N) in application 314(1) running on mobile device 114. In addition, both devices 114 and 121 interact with respective application database 235(1) and 235(2) fetching and storing data as applications 314(1) and 314(2) independently operate.

During a synchronization phase indicated by the dotted line in FIG. 2c, data is transmitted from application database 235(2) on companion through synchronization process 137 directly to business object layer 215 on mobile device 114.

Figure 2D:
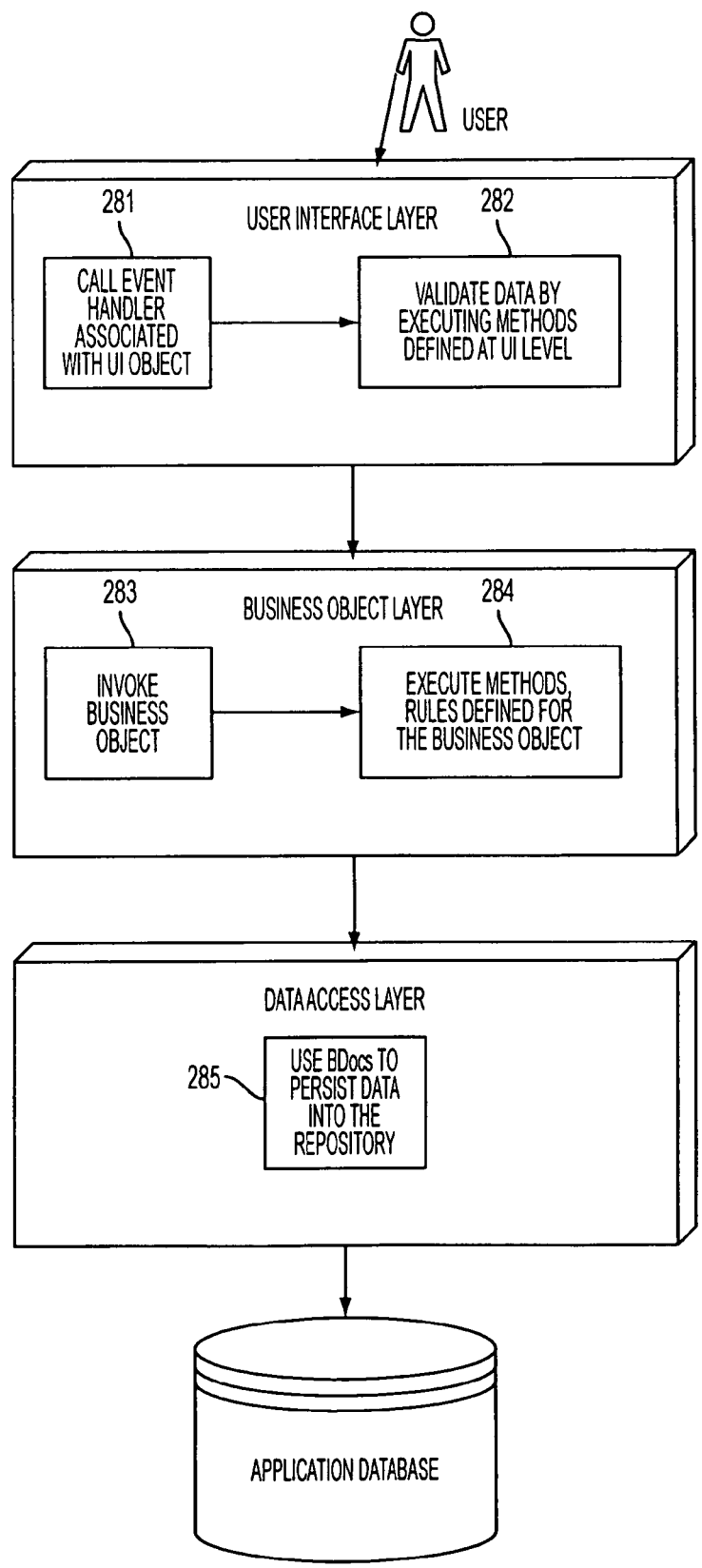
FIG. 2d illustrates the operation of the framework for persisting data.

FIG. 2d illustrates the operation of the framework for persisting data. In step 281, based upon a user interaction with a user interface component, an event handler associated with the UI object is called. In step 282, the data is validated by executing methods associated with the UI component.

In steps 283 and 284, the BOL assumes control. Specifically, in step 283, a business object associated with the UI component is invoked. In step 284, methods and rules associated with the business object 805 are executed.

Control is next passed to the data access layer. In step 285, data is persisted in the application database.

Figure 2E:
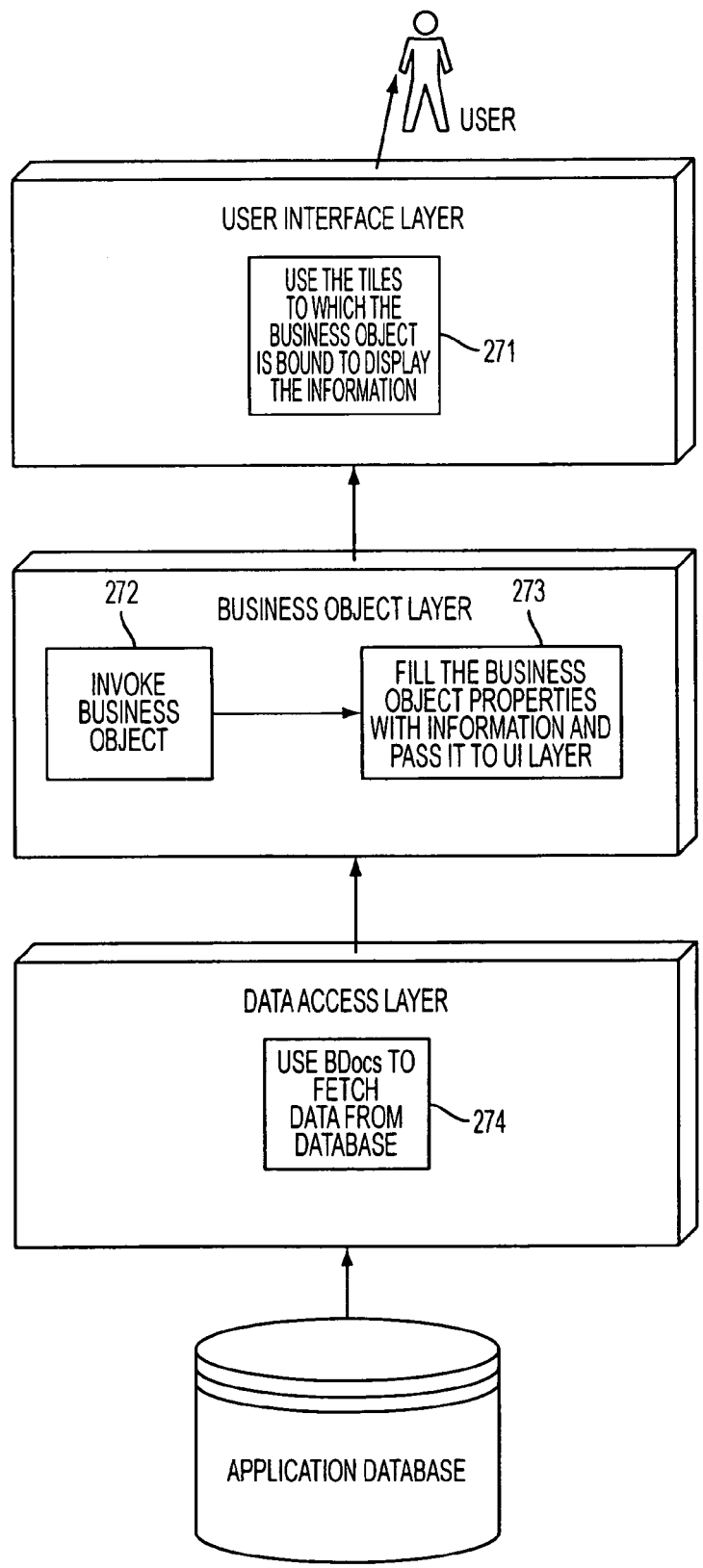
FIG. 2e illustrates the operation of the framework for retrieving data from an application database.

FIG. 2e illustrates the operation of the framework for retrieving data from an application database. In step 274, the data access layer has control and data is fetched form the application database. In steps 272 and 273 the business object layer has control. In step 272, the business object is invoked. In step 273, properties of the business object are filled with data from the database and control is passed to the UI layer. In step 271, the user interface layer has control and data retrieved from the database is displayed.

Figure 3:
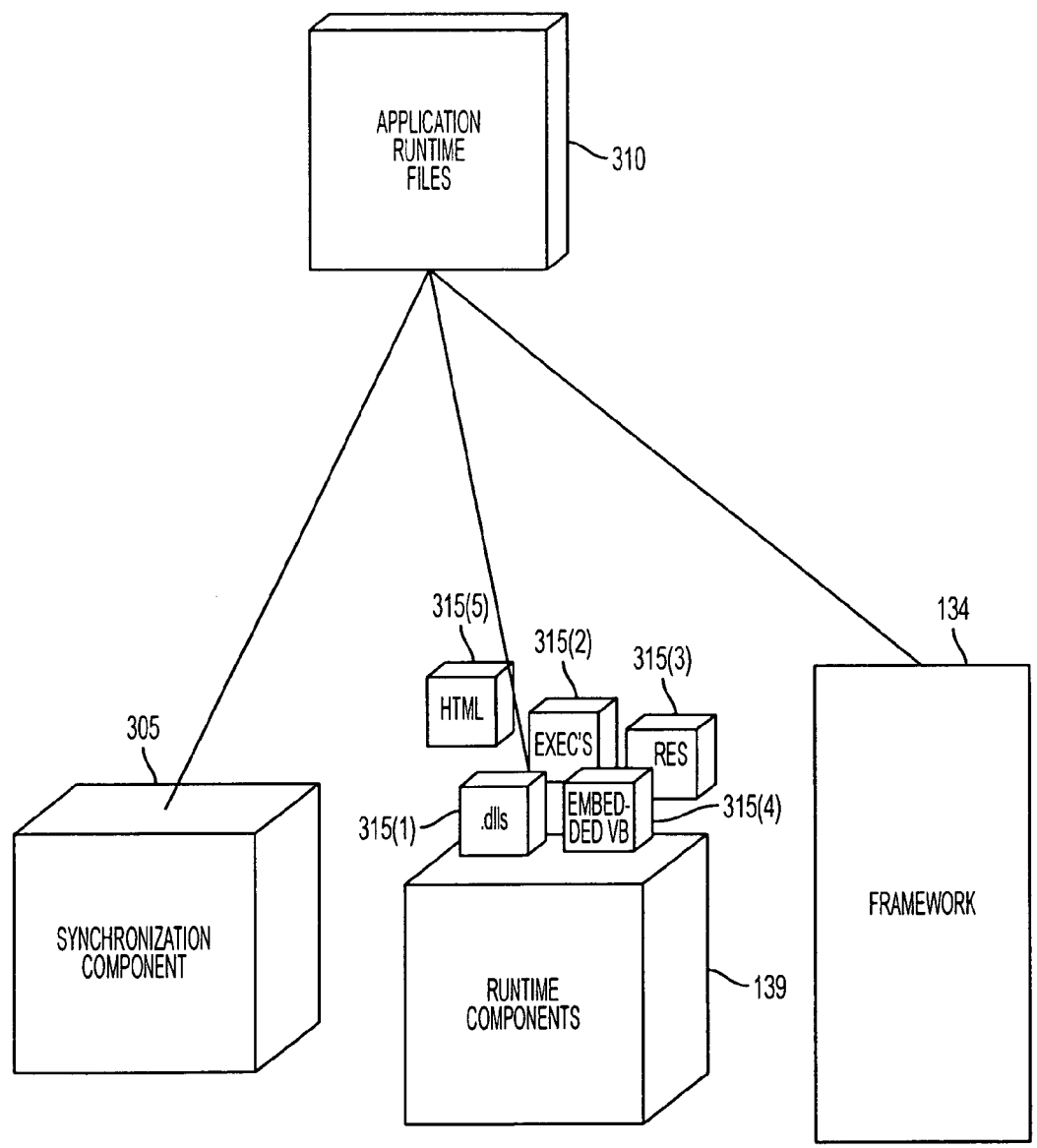
FIG. 3 depicts the structure of an application according to one embodiment of the present invention.

FIG. 3 depicts the structure of an application according to one embodiment of the present invention. Application Runtime Files 310 include framework 134 and runtime components 139. According to one embodiment, an application also includes synchronization component 305. According to the present invention, framework 134 provides generic services and functionality common to any application. Runtime components 139 relate to application specific functionality. Effectively, then, runtime components 139 relate to meta-information that is executed in tandem with framework 134 to provide for customized functionality for application 314. As will become evident as the invention is further described, runtime components 139 are generated from metadata, which represents modeling parameters selected by an application developer using modeler.

As noted previously, according to one embodiment of the present invention, framework includes user interface layer 205, interaction layer 210, business object layer 215 and data access layer 220. Note, however, that the present invention is compatible with any number of framework architectures, and thus, the present invention does not require employment of any or all of UI layer 205, interaction layer 210, BOL layer 215 and data access layer 220. Layers 205, 210 and 215 may be considered as separate portions of a common framework or alternatively as three separate frameworks, each responsible for providing UI functionality, business object functionality and transaction functionality respectively.

As an example, runtime files may include .dlls 315(1), embedded VB ("Visual Basic") files 315(4), HTML ("Hypertext Markup Language") files 315(5), etc. In this particular example, of course, VB files would typically provide additional logic code to augment the functionality of BOL 215, while HTML files 315(5) would provide data for UI layer 205. The particular nature of runtime files will of course depend upon the particular platform upon which application 314 will be executed. Thus, in the case of an application for execution on a laptop, runtime files 310 will typically include .dlls 315(1), which operate in conjunction with the business object layer underlying logic and processing functions of the application and HTML files 315(5), which are used in conjunction with the user interface and interaction layers (205 and 210) for the display of the user interface. On the other hand, an application designed to operate on a companion device such as a PDA may typically use be embedded VB files 315(4). The interaction of the runtime files with the framework is discussed below in more detail in connection with FIG. 13, with the runtime components functioning along with the layers of the framework as an application.

Figure 4:
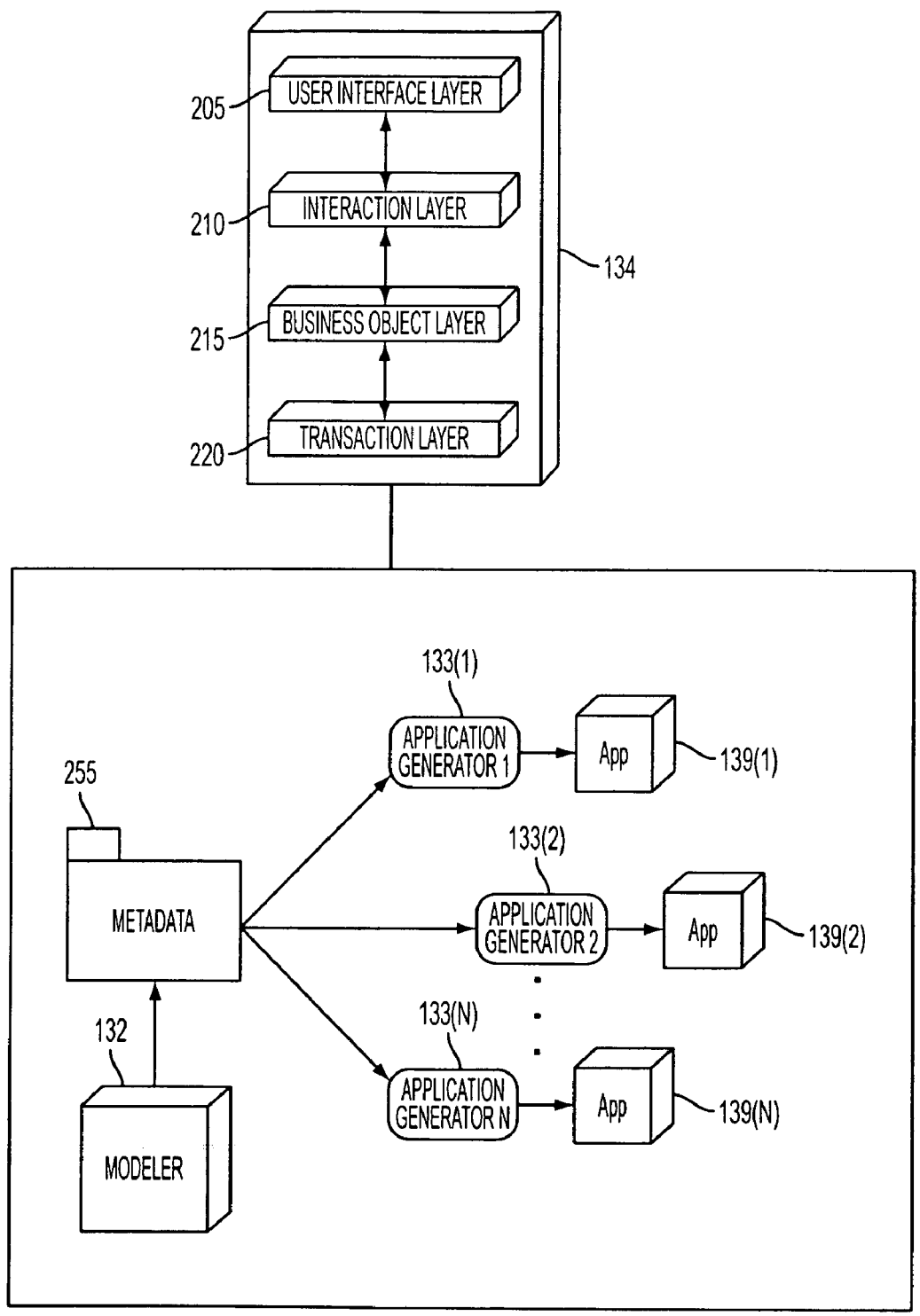
FIG. 4 illustrates the generation of a plurality of applications from a single metadata object according to one embodiment of the present invention.

FIG. 4 illustrates the generation of a plurality of applications from a single metadata object according to one embodiment of the present invention. An application is modeled using modeler 132, which generates metadata 255. Metadata 255 is of generic nature such that it completely characterizes all functionality of an application, which functions within framework 134. The structure and function of metadata 255 will become evident as the invention is further described. However, in general, metadata 255 represents all aspects of the application modeled in modeler 132. Thus, according to one embodiment of the present invention, using the particular framework described herein, metadata 255 includes representations of all business objects, user interface components, and transaction logic as it was modeled in modeler 132.

A number of generators 133(1)–133(N) are also defined. Each generator 133(1)–133(N) receives as input metadata 255 and generates as output runtime files 310. The function of each generator 133(1)–133(N) is to generate respective executable application runtime components 139(1)–139(N) targeted for a particular computing device and/or programming environment. Thus, each generator 133(1)–133(N) is associated and designed in accordance with the specific requirements of particular computing devices on which the application will execute. In this way, the modeling information comprising metadata 255 is adapted via generator for specific computing environments. Examples of various generators and associated devices and programming environments are discussed in detail below.

As metadata 255 is a generic representation of an application, it may be used to generate executable applications specifically adapted to various computing platforms having heterogeneous processing and resource capabilities. Thus, the present invention provides a method for generating a software application for a first computing device and a second computing device having disparate resource and processing capabilities.

Figure 5:
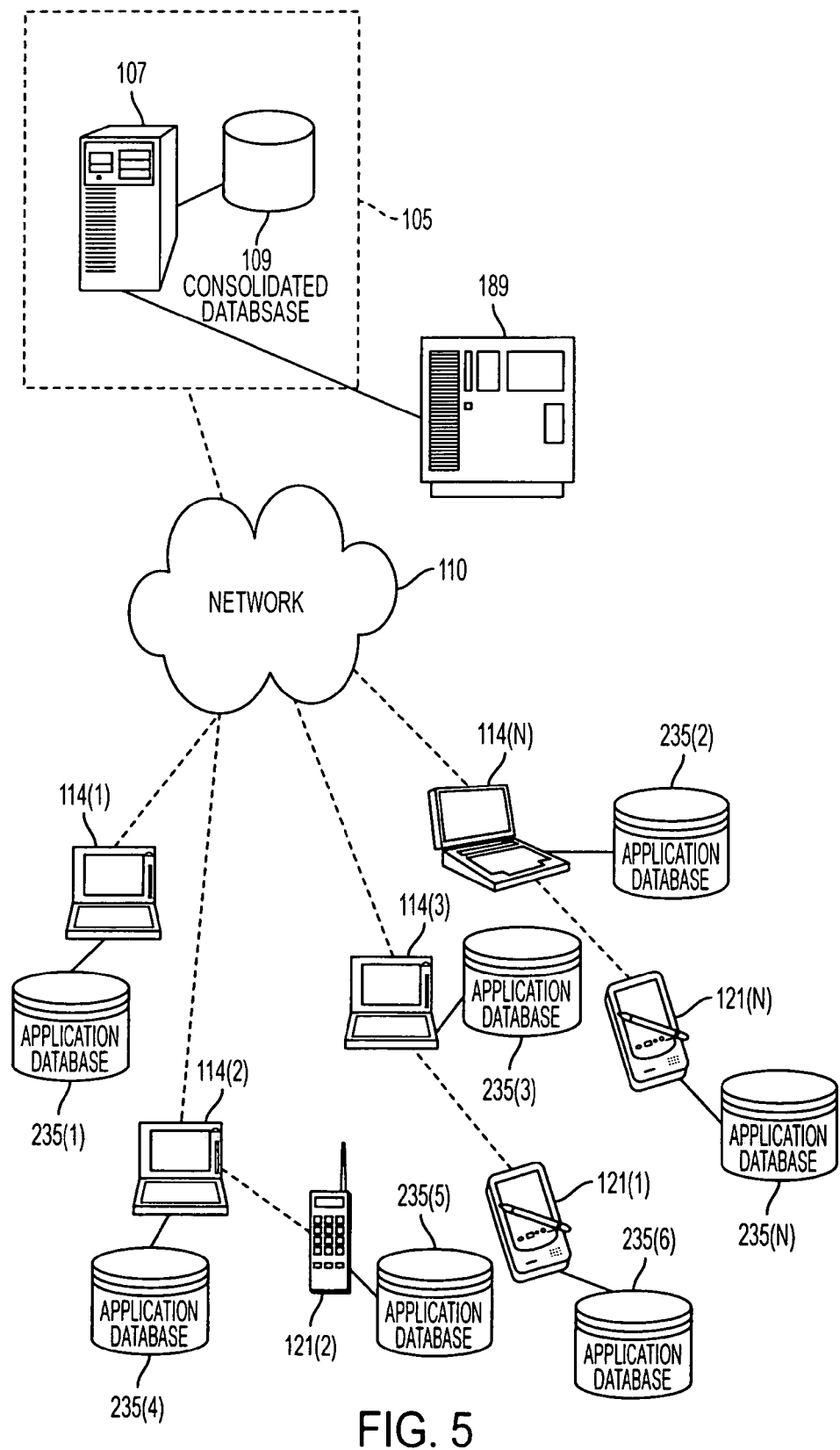
FIG. 5 shows an enterprise 105, a number of mobile devices and a number of companion devices.

According to one embodiment of the present invention, the first computing device is a mobile computing device such as a laptop computer while the second computing device is a PDA device. With this exemplary embodiment in mind, FIG. 5 depicts a deployment environment utilizing computing devices having heterogeneous processing and resource capabilities. In particular, FIG. 5 shows an enterprise 105, a number of mobile devices 114(1)–114(N) and a number of companion devices 121(1)–121(N). Enterprise 105 includes customer relations management ("CRM") server 107 and consolidated database ("CDB") 109. Server 107 interacts with CDB 109 to fetch and store data. Typically CDB 109 maintains a composite representation of the state of data residing on the collection of mobile devices 114(1)–114(N). In addition, CRM server 107 runs numerous processes related to a business application that may operate on data resident in CDB 109. Note that CRM server 107 may also communicate with processing servers 189, which may perform additional processing as well as other tasks such as data replication.

According to one embodiment of the present invention, mobile devices 114(1)–114(N) run offline mobile applications related to various business functions such as order generation, customer management, etc. Mobile devices may include laptop computers, tablet PCs, desktop PC or any other computing device that is located distant from enterprise 105. Mobile devices 114(1)–114(N) may communicate with enterprise 105 via network 110. Network 110 may include any type of public or private, wired or wireless network including the Internet and WWW.

One or more companion devices 121(1)–121(N) may be associated with each mobile device 114(1)–114(N). Companion devices may include PDAs, tablet PCs, laptops, etc. According to one embodiment, companion devices 121(1)–121(N) execute an application that includes a subset of functionality of that available on the associated mobile device 114(1)–114(N). This subset of functionality may be dictated by the available processing power and memory constraints of a companion device. However, despite these bandwidth limitations, field personnel often desire to utilize a companion device in the field due to the convenience aspects of these devices such as their small footprint, weight, etc.

Note that each mobile device 114(1)–114(N) and each companion device 121(1)–121(N) is associated with a respective application database 235(1)–235(N). Application databases 235(1)–235(N) store all data necessary for the execution of applications running on the respective devices, and represent a subset of data on CDB 109. According to one embodiment, an application database 235 may be stored on a hard drive associated with the mobile device (in the case of a laptop, for example) or in non-volatile memory (in the case of a PDA). Thus, although application databases 235(1)–235(N) are depicted as physically distinct from mobile devices 114(1)–114(N) and companion devices 121(1)–121(N), local databases 235(1)–235(N) would typically be physically integrated with the devices themselves.

Figure 6:
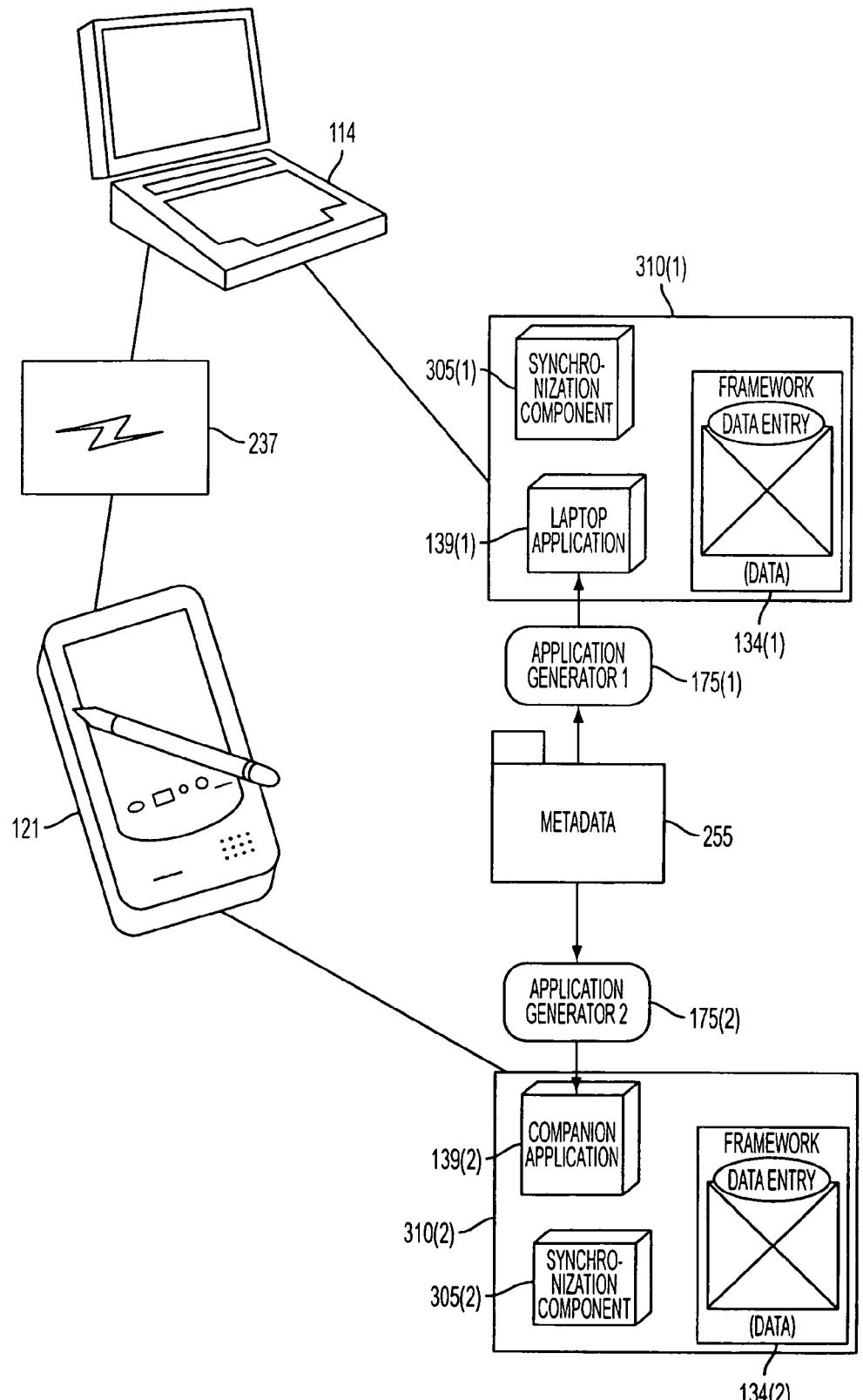
FIG. 6 illustrates the use of metadata for generating software applications for a first and second computing device (in this embodiment a laptop and PDA device respectively).

FIG. 6 illustrates the use of metadata for generating software applications for a first and second computing device (in this embodiment a laptop and PDA device respectively). The structure and function of metadata 255 will become evident as the invention is further described. However, in general, metadata 255 is generated utilizing modeler 132 described in below and specifies an application in a generic manner so that an application may be generated for a specific programming environment or platform. Thus, as shown in FIG. 6, a single metadata object 255 is utilized to generate application runtime components 139(1) for mobile device 114 and application runtime components 139(2) for companion device 121 via respective application generators 175(1) and 175(2). Application runtime components 139(1), framework 134(1) and synchronization component 305(1) comprise runtime framework 310(1), which is deployed to mobile device 114. Similarly, application runtime components 139(2), framework 134(2) and synchronization component 305(2) comprise runtime framework 310(2), which is deployed to companion device 121. Note that mobile device 114 and companion device 121 utilize synchronization components 305(1) and 305(2) to synchronize data related to respective application runtime components 139(1) and 139(2). An exemplary synchronization process 237 will be described in detail below.

Figure 7:
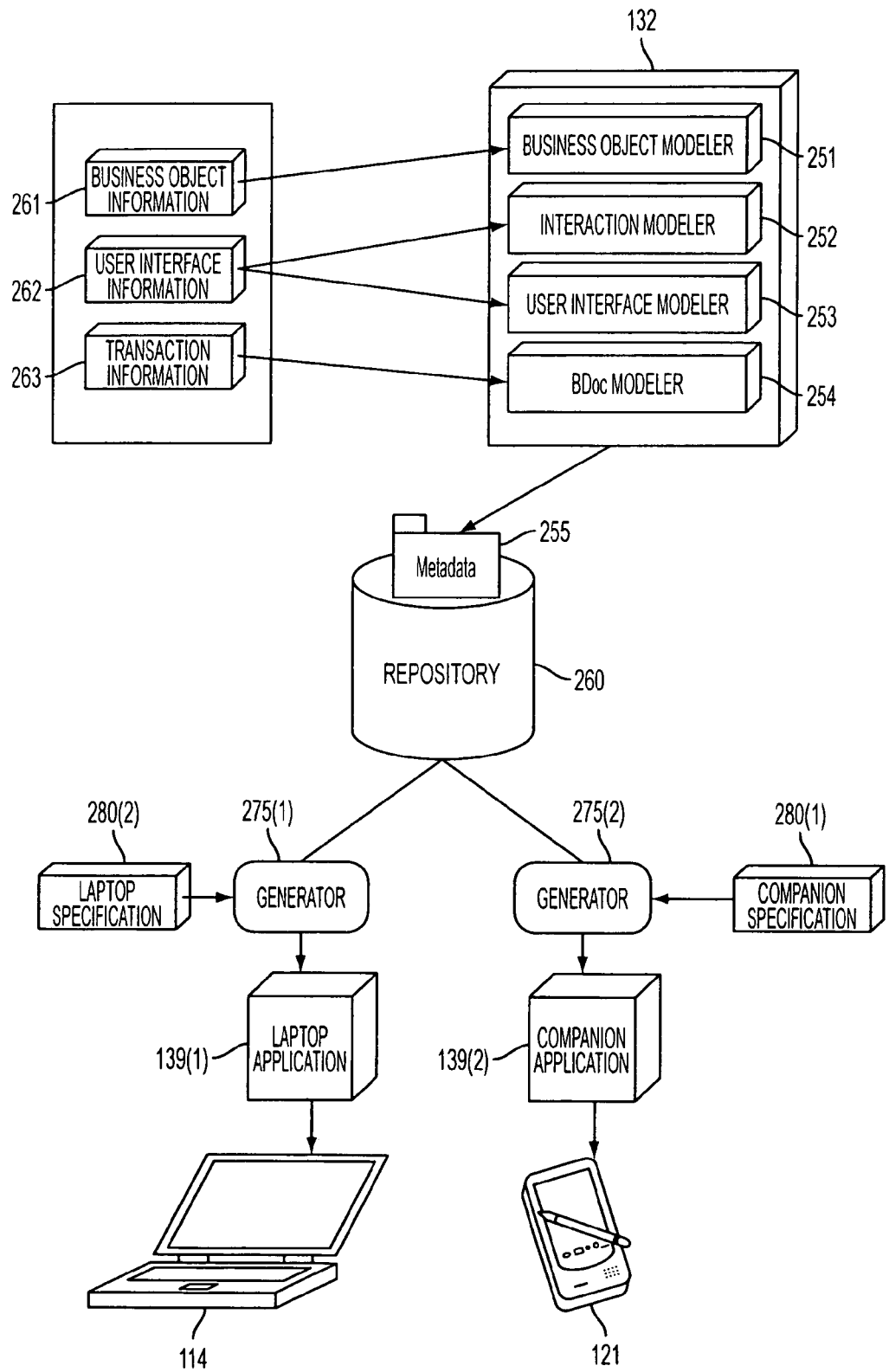
FIG. 7 illustrates an overview of the generation of an application modeled in modeler 132 for a mobile and companion device according to one embodiment of the present invention.

FIG. 7 illustrates an overview of the generation of an application modeled in modeler 132 for a mobile and companion device according to one embodiment of the present invention. According to one embodiment of the present invention, modeler 132 includes business object modeler 251, interaction modeler 252, user interface modeler 253, and business document ("BDoc") modeler 254. Business object modeler 251 receives business object information 261, which is used to define the structure and function of business objects included in the application. Interaction modeler 252 and user interface modeler 253 receive user interface information 262, which is used to model the visual appearance and behavior of the user interface for the application. Transaction information 263 is received by BDoc modeler 254 to model transaction behavior of the application. Typically, business object information 261, user interface information 262 and transaction information 263 are generated by a human operator. However, according to alternative embodiments, this information may be generated using an automated process.

Based upon the modeled business object information 261, user interface information 262 and transaction information 263, modeler 132 generates metadata 255, which is stored in mobile application repository ("MAR") 260. As described in detail below, MAR 260 in conjunction with application repository services ("ARS") (not shown), is used to provide a navigable object database, which is read by generators 275(1) and 275(2) to generate laptop application runtime components 139(1) and companion application runtime components 139(2). Note that companion specification 280(1) and laptop specification 280(2) are respectively utilized to define the operation of generators 275(1) and 275(2). That is, as described above, generators 275 generate an application for a particular target platform (in this case generators 275(1) and 275(2) generate respective applications for mobile 114 and companion devices 121) and thus are adapted to account for the particular nature of the platforms upon which the generated application runtime components 139 will run.

Figure 8A:
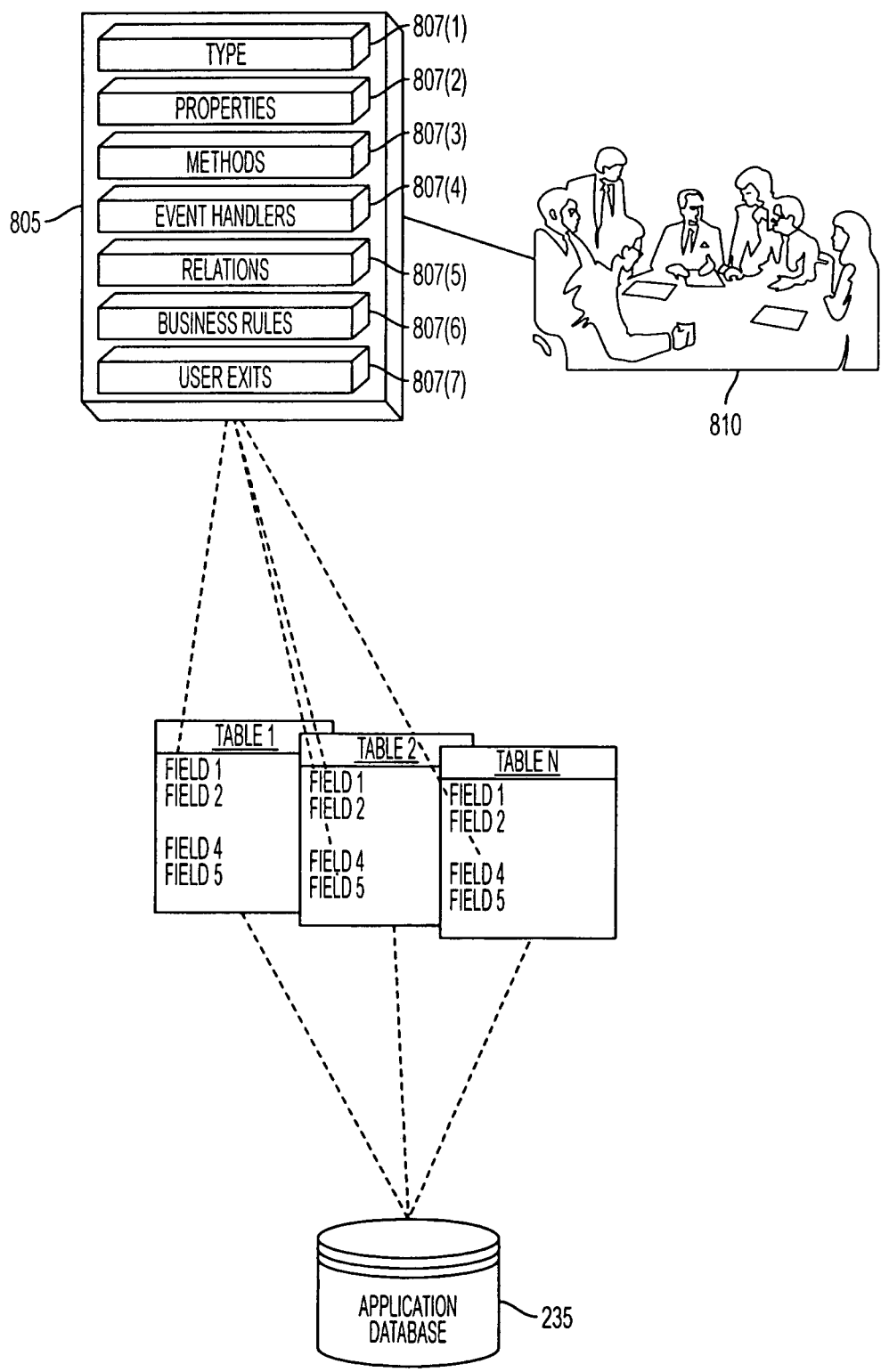
FIG. 8*a* depicts the structure of a business object according to one embodiment of the present invention.

FIG. 8a depicts the structure of a business object according to one embodiment of the present invention. Note that a business object is an object type modeled in meta-modeler 131. Each business object 805 is an object that represents a physical or logical entity in a business scenario. An advantage of business objects is that they provide elements that are richer and closer to the business domain than the typical elements of relational databases. Core generic business objects can be customized to specific business requirements. Business objects provide a significant development-time advantage in that the developer may conveniently construct application runtime components 139 using objects that correspond to real business entities and thus exhibit behaviors and attributes of these real world entities. For example business objects 805 may be created for business entities such as business partners, orders, address, product, etc. In general, business partner definitions will depend upon the particular nature of business and application.

In order to provide this functionality, business objects provide an abstraction of an underlying relational database utilizing common notions of business entities. This is illustrated in FIG. 8a, which shows that fields spanning multiple tables in local database 235 may be aggregated into a single business object 805. The abstraction of local database 235 provides a significant development advantage in that developers may work with convenient and natural collections of data in relation to normal business entities, regardless of whether the data spans multiple tables in a relational database.

According to one embodiment of the present invention, each business includes type 807(1), properties 807(2), methods 807(3), event handlers 807(4), relations 807(5), business rules 807(6) and user exits 807(7). As will be described in detail below the implementation of business objects utilizes the physical database independent transaction services to implement object persistence.

Note that business objects 805 are abstracted from the underlying data storage requirements imposed by an application database ("ADB") 235. Typically, ADB 235 is a relational database including a plurality of tables representing data associated with the application. However, as will become evident as the invention is further described, the business objects permit the developer to define arbitrarily abstract representations of the data in ADB, which may be coupled to the underlying relational database structure in highly complex ways. This allows the developer to define applications that relate to entities 810 that function in a more realistic and natural manner to the business environment. A data access layer, which is described in detail below, provides a mapping interface between business objects and the underlying ADB.

Type 807(1) represents a type of business object.

Business object properties 807(2) characterize a business objects and define the state of a business object during runtime. For example, a business object called default address might include properties 807(2) including name, city, street, zip code and house number. Business object properties 807(2) correspond to the instance information for the modeled object types. During runtime, object properties 807(2) are generated either by user input or from fetching data from application database 235 and correspond to modeled type instance 137 shown in FIG. 1*b*.

Business object methods 807(3) are operations that can be performed on a business object and define the behavior (i.e., business logic) of a business object. For example, a business object method could be defined relating to the configuration rules for a product. According to one embodiment of the present invention, business object methods can be called from other business object methods or from event handlers for particular objects in UI layer 205. Business object methods 807(3) comprise discrete segments of program code that are used to customize the behavior of particular business objects for a particular purpose. The program language used for coding of business object methods 807(3) will of course depend upon the particular target platform upon which the application will execute. For example, according to one embodiment, business object methods would be written in visual basic for applications ("VBA").

Event handlers 807(4) perform operations based upon certain events that occur in relation to business objects. Events are messages sent within a program if certain user actions occur (e.g., creation, changing, saving or deletion of a business object). Event handlers 807(4) comprise user-definable segments of program code that may be coupled to these events. Upon the occurrence of an event (i.e., a trigger), one or more event handlers 807(4) associated with the event is called by framework 134. According to one embodiment of the present invention exemplary invent handler triggers include BEFORE_SAVE, which is called before a business object 805 is saved to application database. Thus, an event handler for the trigger event BEFORE_SAVE for particular business object 805 such as customer could be defined, wherein the event handler would be called prior to saving the customer business object 805 in the application database 235. Similarly, an event handler could be defined for the trigger AFTER_SAVE, wherein the event handler would be called after the business object 805 was saved in the application database 235.

Relations 807(5) define relationships between one or more business objects 805. In particular, relations declare rules for how a state change of a particular business object 805 should affect the state of another business object 805. Relations 807(5) may be also used to fetch data, wherein one business object 805 is related to another. For example, a first business object 805 "order" and a set of related business object 805 "order items" stand in a particular relationship and the fetching of data for the business object "order" 805 requires fetching of data for each of the "order items" and therefore, the relations 807(5) between these business objects can be consulted to carry out the data fetch. Relations information 807(5) may include cardinality, optional in relation, type, action if deleted (etc.). In the "order" and "order items" example, the cardinality would be 1:n.

Relations 807(5) may also be used to perform a cascade delete. For example, if the business object "order" 805 is deleted, all "order items" business objects 805 related to that business object need to be deleted. This is accomplished using the relations information 807(5).

Business rules 807(6) are user-definable segments of program code, which perform various functions upon certain pre-defined events. According to one embodiment of the present invention, three types of business rules 807(6) include: "save" business rules, "delete" business rules and property level rules. Save business rules 807(6) are executed when the associated business object 807(6) is saved. Similarly, delete business rules 807(6) are executed when the associated business object 807(6) is deleted. Property level business rules 807(6) are executed whenever a property 807(2) associated with the business object 805 changes.

According to one embodiment, business rules 807(6) are utilized to implement constraints on a business object's state in order to ensure business object model consistency. For example, business rules 807(6) may be defined for a business object 805 to ensure that a certain condition is true for a business object at any time such as that the start date of an appointment must be before its end date. As another example, a business rule might be defined for a business object to prevent the deletion of the business object once an order has been uploaded to enterprise 105. In this sense, business rules 807(6) may be utilized to perform validations on the state of business objects 805 during runtime.

According to one embodiment different types of business rules 807(6) may be defined including save rules, which are triggered upon saving a business object 805, delete rules, which are triggered upon deletion of a business object 805. Every business rule 807(6) associated with a business object 805 has a priority per category (e.g., save rules and delete rules) that determines the order in which the business rules 807(6) are fired. For example, the business object BOEMPLOYEE 805 might have the following save rules 807(6)—AreDatesValid, IsLogicalAddressUnique. If AreDatesValid is assigned priority 1 and IsLogicalAddressUnique is assigned priority 2, then AreDatesValid would be executed before IsLogicalAddressUnique. Note that the priority of business rules 807(6) is business object 805 dependent. Thus, both of the above-mentioned business rules 807(6) could be assigned to another business object 805 and in that case the priorities could be assigned differently.

User exits 807(7) are development objects that represent customer-defined code. User exits 807(7) are used to enhance the functionality of existing code in accordance with customer requirements. Thus, user exits 807(7) allow for customization of business objects 805 in accordance with user defined needs.

Figure 8B:
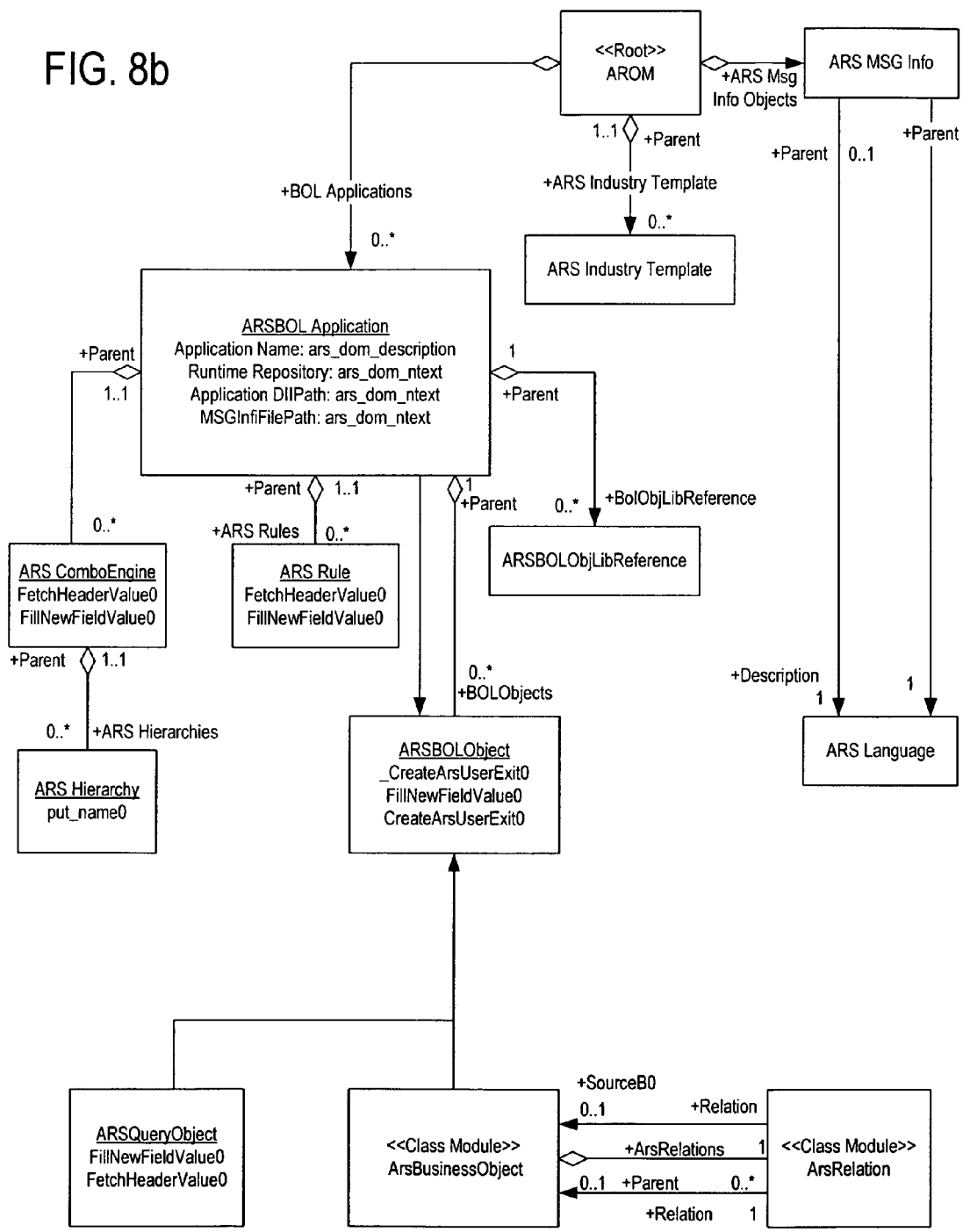
FIG. 8*b* depicts a class diagram for business objects according to one embodiment of the present invention.

FIG. 8b depicts a class diagram for business objects according to one embodiment of the present invention.

Each business object 805 functions as an abstract representation of a physical or logical entity providing a specific function within a business scenario. Business objects provide significant benefits in developing business applications in providing elements that are richer and more natural to the business domain than the typical elements of relational databases, i.e., a set of tables. Business objects 805 are also associated with a set of behaviors that allows them to interact in a dynamic manner. Further, business objects can be associated with one another via relations 807(5) to further enhance the richness of their behaviors. Code reuse is fostered by the fact that business objects can be customized to specific business requirements.

Figure 8C:
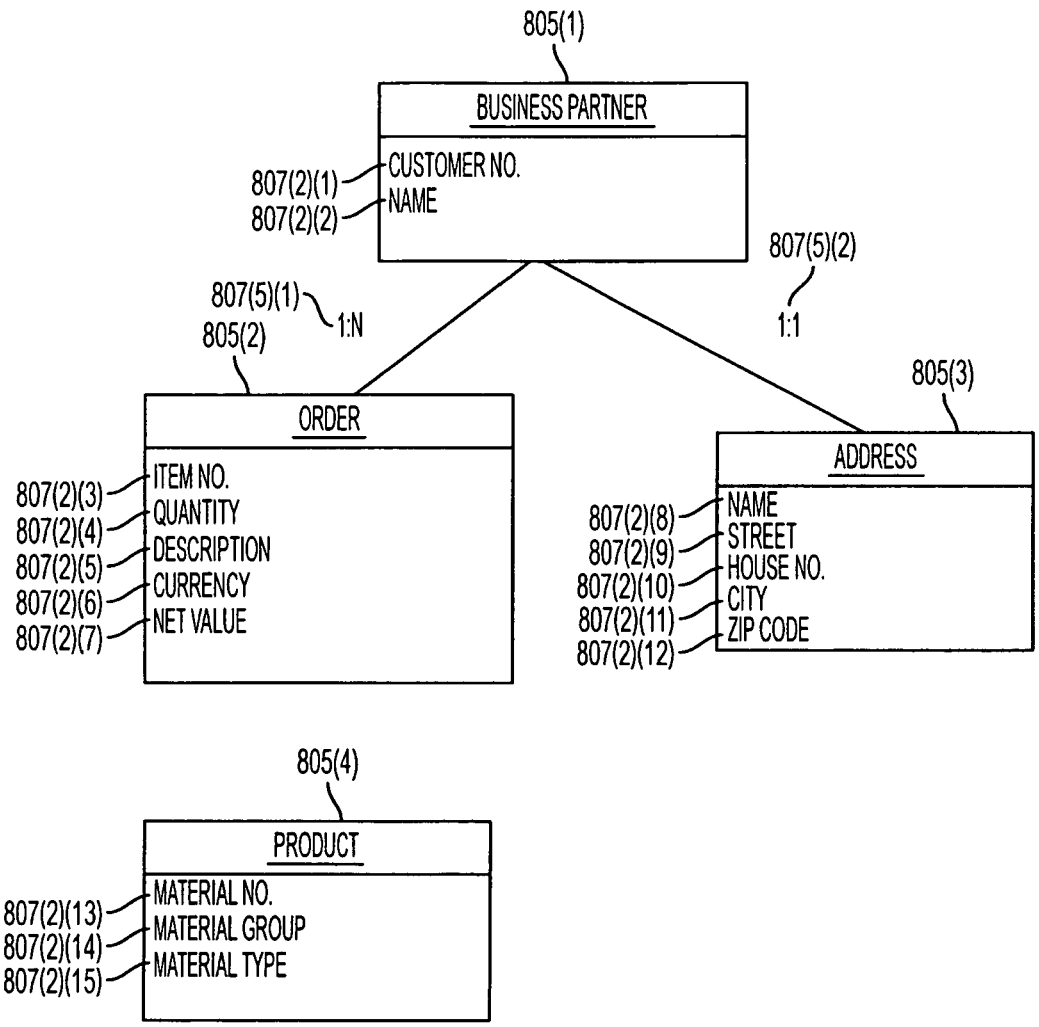
FIG. 8*c* depicts a plurality of business objects according to one embodiment of the present invention.

For example, as shown in FIG. 8c business objects may include orders, business partners, products, addresses, etc. Each business object is associated with a set of properties 807(2), methods 807(3), event handlers 807(4), relations 807(5), business rules 807(6), etc. as specified in FIG. 8a. Thus, as an example business partner 807(1) would have properties of customer No. 807(2)(1) and Name 807(2)(2). Order 805(2) would have properties of Item No. 807(2)(3), Quantity 807(2)(4), Description 807(2)(5), Currency 807(2)(6) and Net Value 807(2)(7). Similarly Address 805(3) would have properties Name 807(2)(8), Street 807(2)(9), House No. 807(2)(10), City 807(2)(11) and Zip Code 807(2)(12). Finally Product 805(4) would have properties Material No. 807(2)(13), Material Group 807(2)(14) and Material Type 807(2)(15). Note that relation 805(5)(1) shows that the cardinality between Business Partner 805(1) and Order 805(2) is 1:N, while the cardinality between Business Partner 805(1) and Address 805(3) is 1:1.

The logical definition of business objects will vary between enterprises and among industries. For example, a company whose principal business operations involve the selling of physical widgets would typically employ a distinct set of business objects such as orders, business partners, products, addresses etc. On the other hand, a service company would typically define a different set of business objects.

Figure 9A:
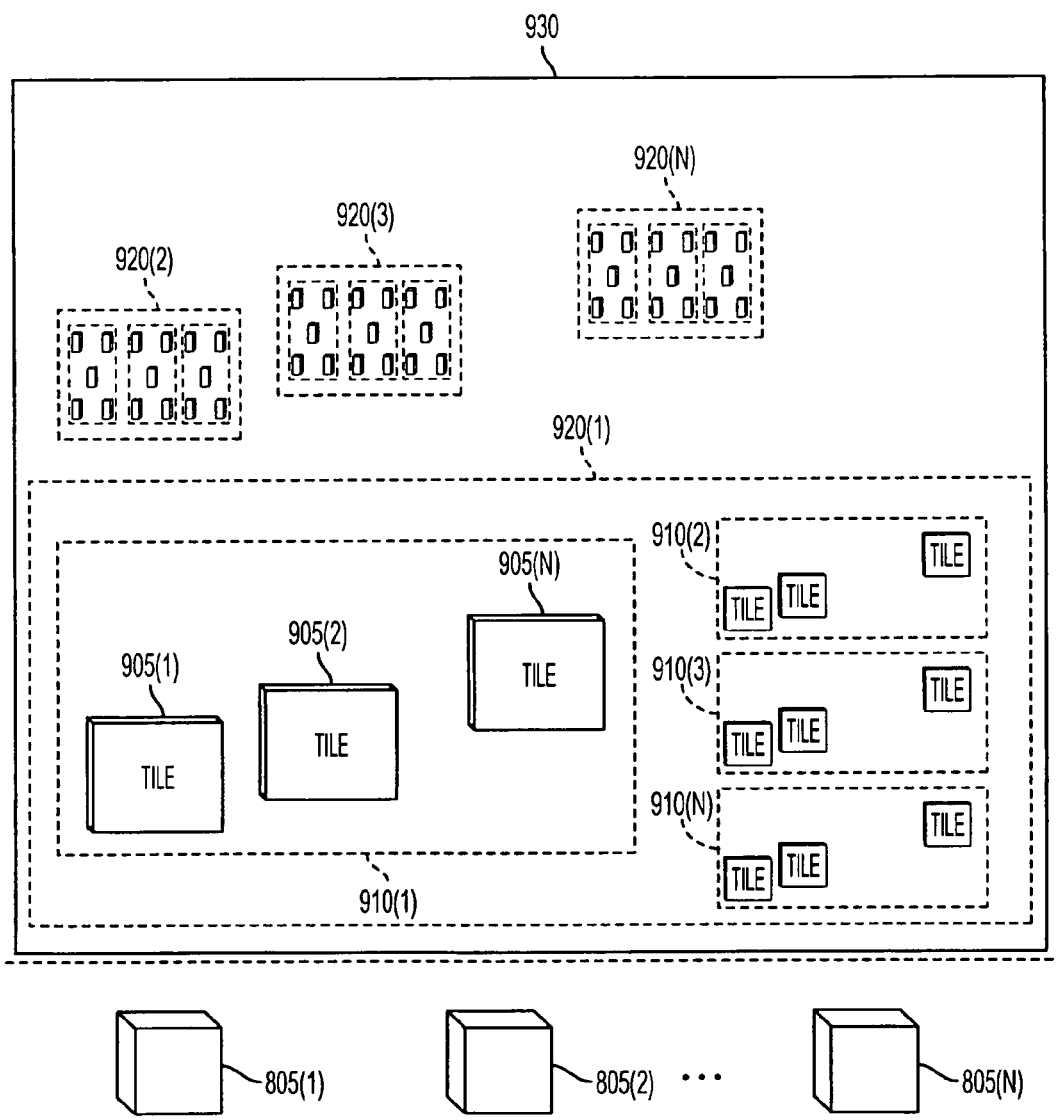
FIG. 9*a* depicts the relationship among a number of UI objects according to one embodiment of the present invention.

FIG. 9a depicts the relationship among a number of UI objects according to one embodiment of the present invention. Tiles 905 comprise the fundamental UI unit. Tiles provide for input and output of data from business objects 805. As shown in FIG. 9a, tiles 905(1)–905(N) are grouped into tilesets 910(1)–910(N). Tilesets 910(1)–910(N) are grouped into business components 920(1). Finally, business components 920(1)–920(N) are grouped into an application component 930.

Figure 9B:
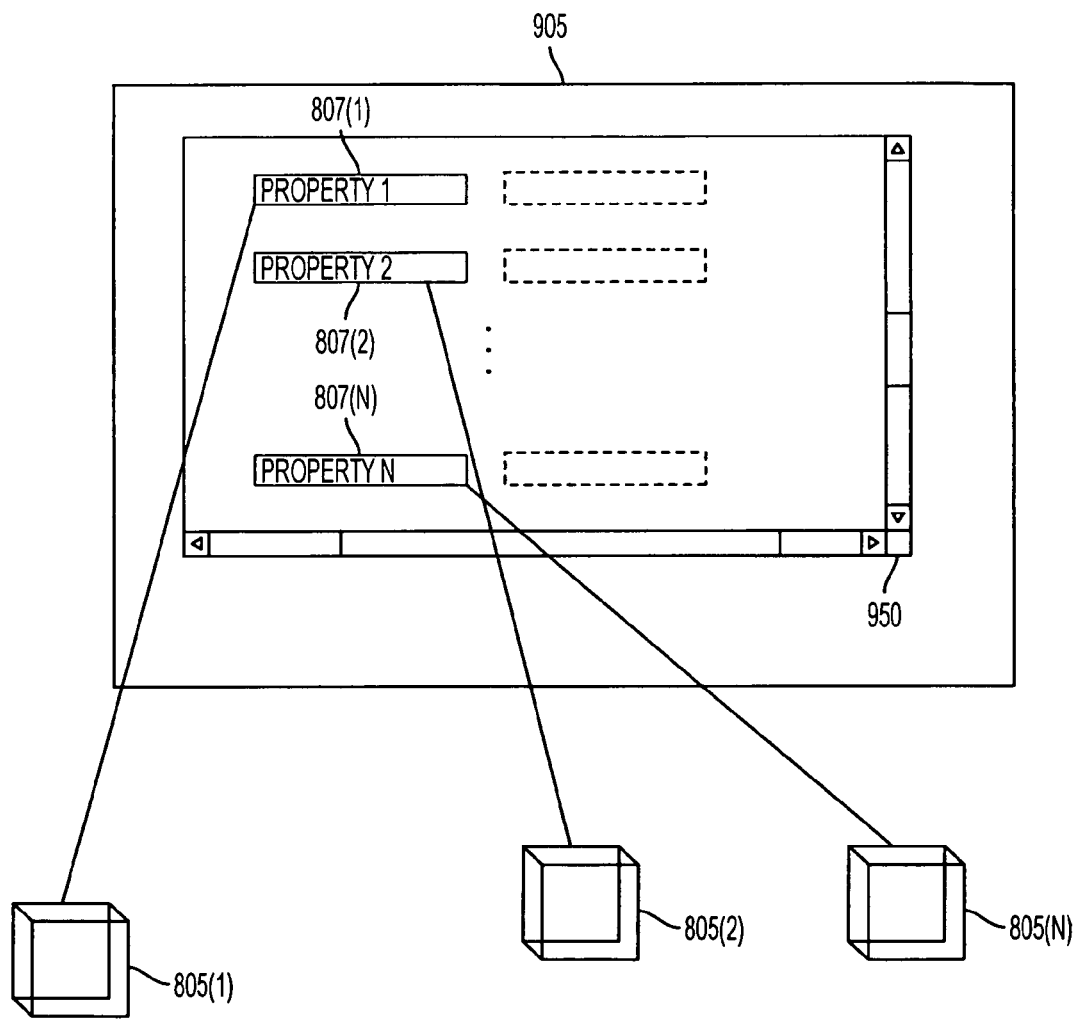
FIG. 9*b* depicts the structure of a tile in relation to a plurality of business components according to one embodiment of the present invention.

FIG. 9b depicts the structure of a tile in relation to a plurality of business components according to one embodiment of the present invention. Tile 905 includes control 950. Properties 807(1)–807(N) of respective business objects 805(1)–805(N) are displayed on tile 905. Among other functionalities, a tile 905 allows for display of business object properties or input of data.

Figure 10:
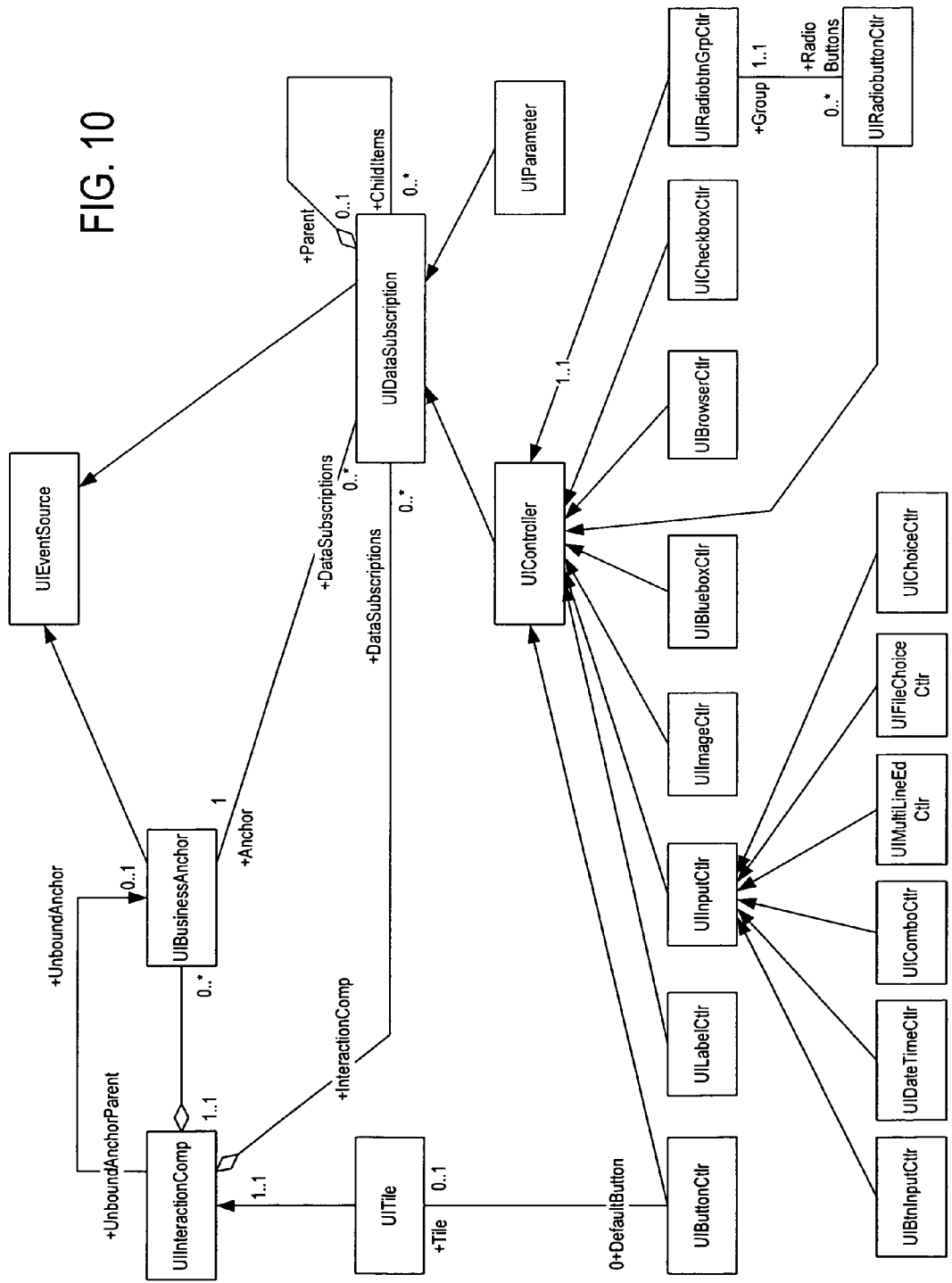
FIG. 10 depicts relationships among a number of UI objects according to one embodiment of the present invention.

FIG. 10 depicts relationships among a number of UI objects according to one embodiment of the present invention.

Figure 11:
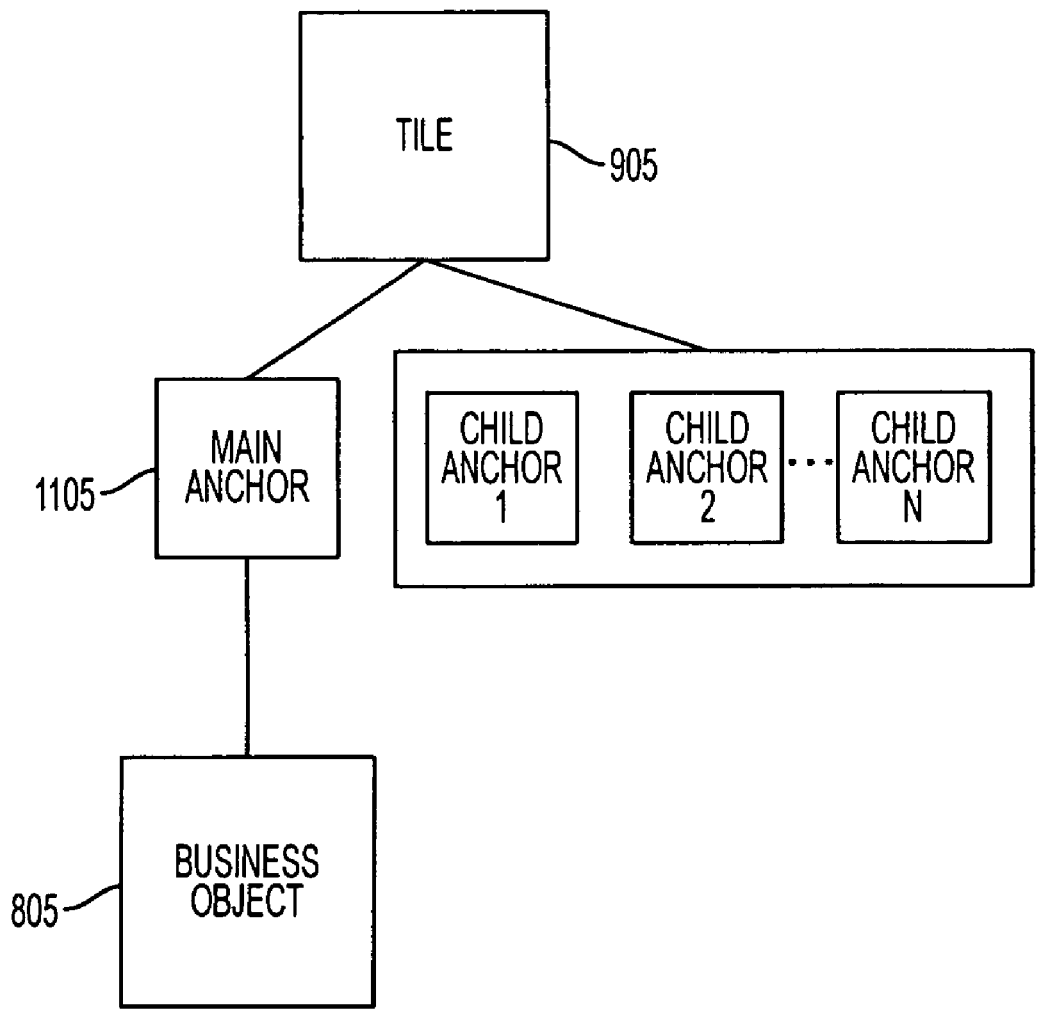
FIG. 11 depicts a relationship between a tile and business object according to one embodiment of the present invention.

FIG. 11 depicts a relationship between a tile and business object according to one embodiment of the present invention. Anchor 1105 is a data structure that links a tile 905 to a business object 805.

Figure 12:
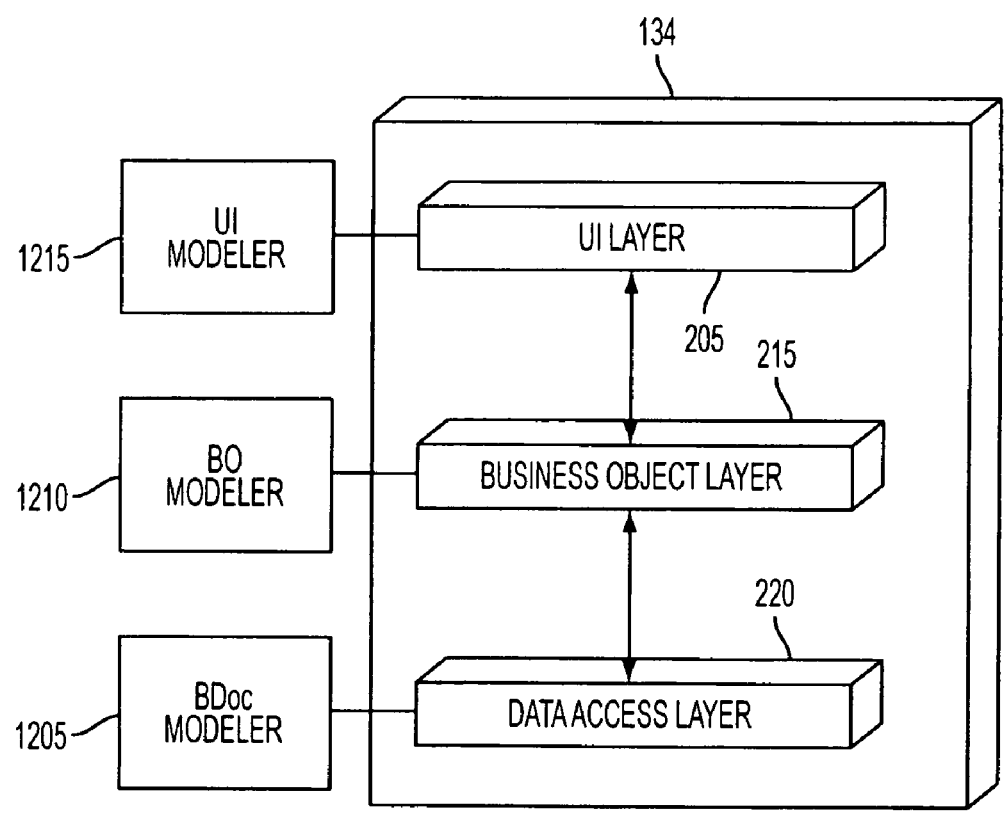
FIG. 12 depicts a number of modeling tools in relation to a framework according to one embodiment of the present invention.

FIG. 12 depicts a number of modeling tools in relation to a framework according to one embodiment of the present invention. As shown in FIG. 12, UI layer 205 is associated with UI modeler 1215, business object layer 215 is associated with business object modeler 1210 and data access layer 220 is associated with BDoc modeler 1205.

Business object modeler 1210 provides tools for defining business objects 805 and associated business logic. UI modeler 1215 provides tools for defining instances of user interface components such as tiles, tilesets, business components and application components. BDoc 1205 modeler provides graphical tools for defining a mapping between a database (i.e., ADB) and the business object layer 210. In particular, BDoc modeler allows the mapping from business objects to tables and fields in ADB. Runtime queries to ADB are generated as a function of the BDoc model created in the development environment.

Figure 13:
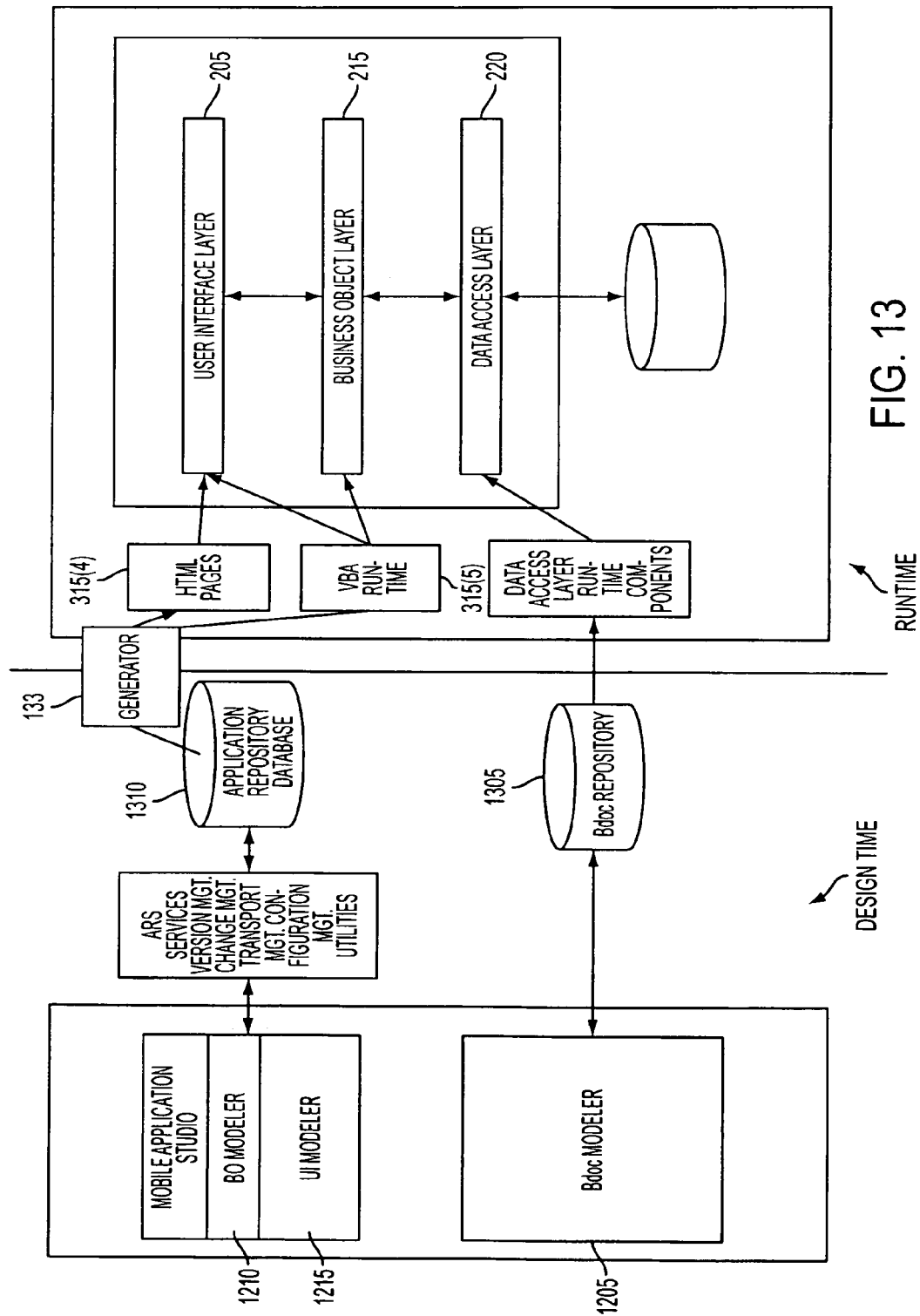
FIG. 13 depicts the architecture of a development tool for generating applications according to one embodiment of the present invention.

FIG. 13 depicts the architecture of a development tool for generating applications according to one embodiment of the present invention. Application repository database 1310 stores metadata 255, which is generated from BO modeler 1210 and UI modeler 1215. BDoc repository 1305 stores output from BDoc modeler 1205.

Generator 133 reads metadata stored in application repository database 1310 and generates runtime components, which in this instance are HTML pages 315(4) corresponding to UI modeling and VBA runtime 315(5) corresponding to business object modeling.

Runtime components function along with framework layers 205, 215 and 220 as an application.

Figure 14:
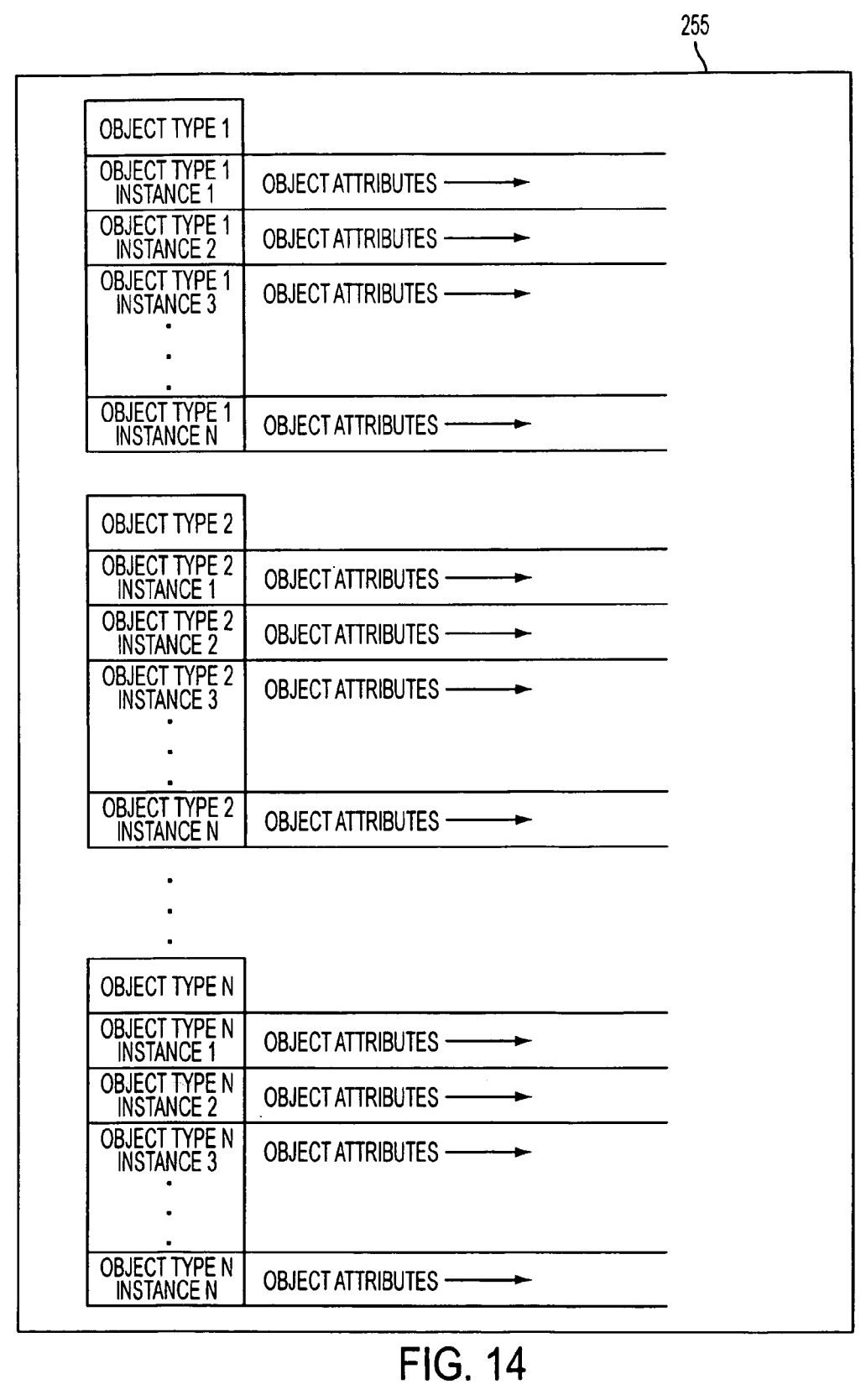

FIG. 14 depicts the structure of metadata produced by a modeling tool according to one embodiment of the present invention. As shown in FIG. 14, according to one embodiment, metadata includes instances of object types in a table structure, which is read by a generator 133. A generator 133 is associated with each platform upon which the application is to execute. Each generator 133 generates an application using selected portions of the metadata structure commensurate with the capabilities of the computing device upon which the application will run. Thus, portions of the metadata structure corresponding to computationally intensive program code would typically not be included in a particular generator's read, where that generator was associated with a computing device having limited processing capabilities.

Figure 15A:
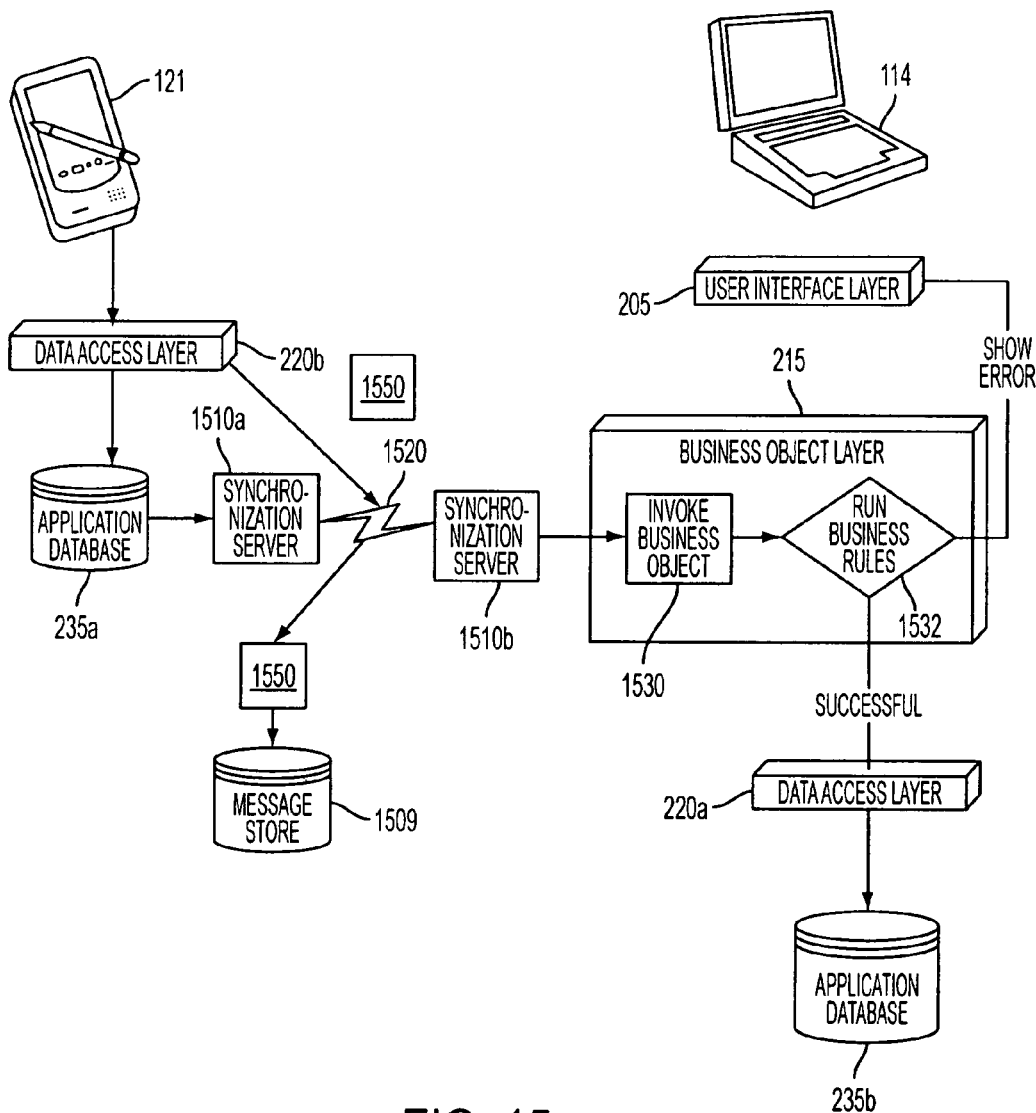
FIG. 15*a* shows a synchronization process from a companion device such as a PDA to a mobile device such as a laptop according to one embodiment of the present invention.

FIG. 15a shows a synchronization process from a companion device such as a PDA to a mobile device such as a laptop according to one embodiment of the present invention. According to the present invention, synchronization is achieved by maintaining on the companion device a listing of all user initiated events occurring during runtime. By maintaining this event list, synchronization can occur with the mobile device 121 simply by during synchronization stepping through the event list and directly inputting these events to BOL 215 on the mobile device 114 such that it is as if events were generated on the mobile device 114 itself. The process for accomplishing this is outlined below.

First, in particular, according to one embodiment of the present invention, companion device 121 stores data in application database 235a as a function of user interaction with the device, such as entering new data, storing, etc. This is accomplished via data access layer 220b, which may only provide a limited subset of functionality compared with a data access layer 220a running on mobile device 114. In particular, according to one embodiment, data access layer 220b functions to store business objects 805 instantiated on companion 121 in a simple table form, wherein the property instance data for the business objects 805 are stored in the tables. Furthermore, according to one embodiment, upon the creation of a new business object 805 on companion device 121, a unique ID is generated and assigned to the business object and stored in application database 235a.

Furthermore, according to one embodiment of the present invention, mobile device 114 and companion device 121 both run a middleware process 1520. Middleware 1520 provides a myriad of services including providing data transport mechanisms between devices. In addition, middleware 1520 exposes a number of APIs, which include functionality for generating messages, which may be stored on a device such as companion device 121 or mobile device 114. In particular, with respect to FIG. 15a, middleware 1520 provides a number of API calls to store messages 1550 in a specific memory area (such as disk, etc) 1509. A data structure for an exemplary message 1550 is depicted with respect to FIG. 15c. However, for present purposes it is sufficient to realize that messages 1550 capture all pertinent information related to an event occurring on companion device 121. These messages 1550 are typically stored separately from the application data.

According to one embodiment of the present invention, the application on companion device 121 includes application specific code in event handlers to invoke the API calls for the writing of messages 1550 provided by middleware synchronization server 1510a upon any user initiated event. These events would typically include saving or deleting of business objects on the companion device 121. Thus, for example, data access layer 220b could be responsible for calling the APIs of middleware 1520 required to store messages 1550 at the same time data is stored or changed in the application database. However, this function could be accomplished by some other entity or process on the companion device. What is important is that the companion device compiles an event list during run time representing user interaction with the device, which can be utilized later for synchronization purposes.

Upon the initiation of the synchronization process such as placing the companion device 121 on a cradle for example, middleware 1520 initiates a process to begin the transmission of the aggregated messages to the mobile device 114. Middleware 1520 then transports messages 1550 from message store 1509 through any communications stack desired and across the physical layer where they are received by synchronization server 1510b on mobile device 114.

Upon receiving each message 1550, synchronization server 1510b determines whether the message corresponds to a new creation of a business object 805. According to one embodiment, synchronization server 1510b determines this by detecting a flag in the message indicating the object is new. If so (meaning the object is new), the synchronization server 1510b calls an API exposed by framework 134 to instantiate the business object 805 on the mobile device 121 (1530). In addition, synchronization server 1510b calls an API exposed by framework 134 to save the instantiated business object 805 on the mobile device 114. Upon the save action, all business rules associated with the save are then automatically executed by the framework 134 in 1532.

If for some reason the save fails on mobile device 114, a delete message is generated on mobile device 114, which is then transmitted back down to companion 121 during the next synchronization process.

If the flag in message 1550 indicates that the business object is not new, the business object 805 already exists on the mobile device 114. In this case, an instance of the business object 805 is created via data access layer 220a and application database 235b, the properties are updated based upon information contained in the message 1550 and the business object is then again stored in application database 235b.

Figure 15B:
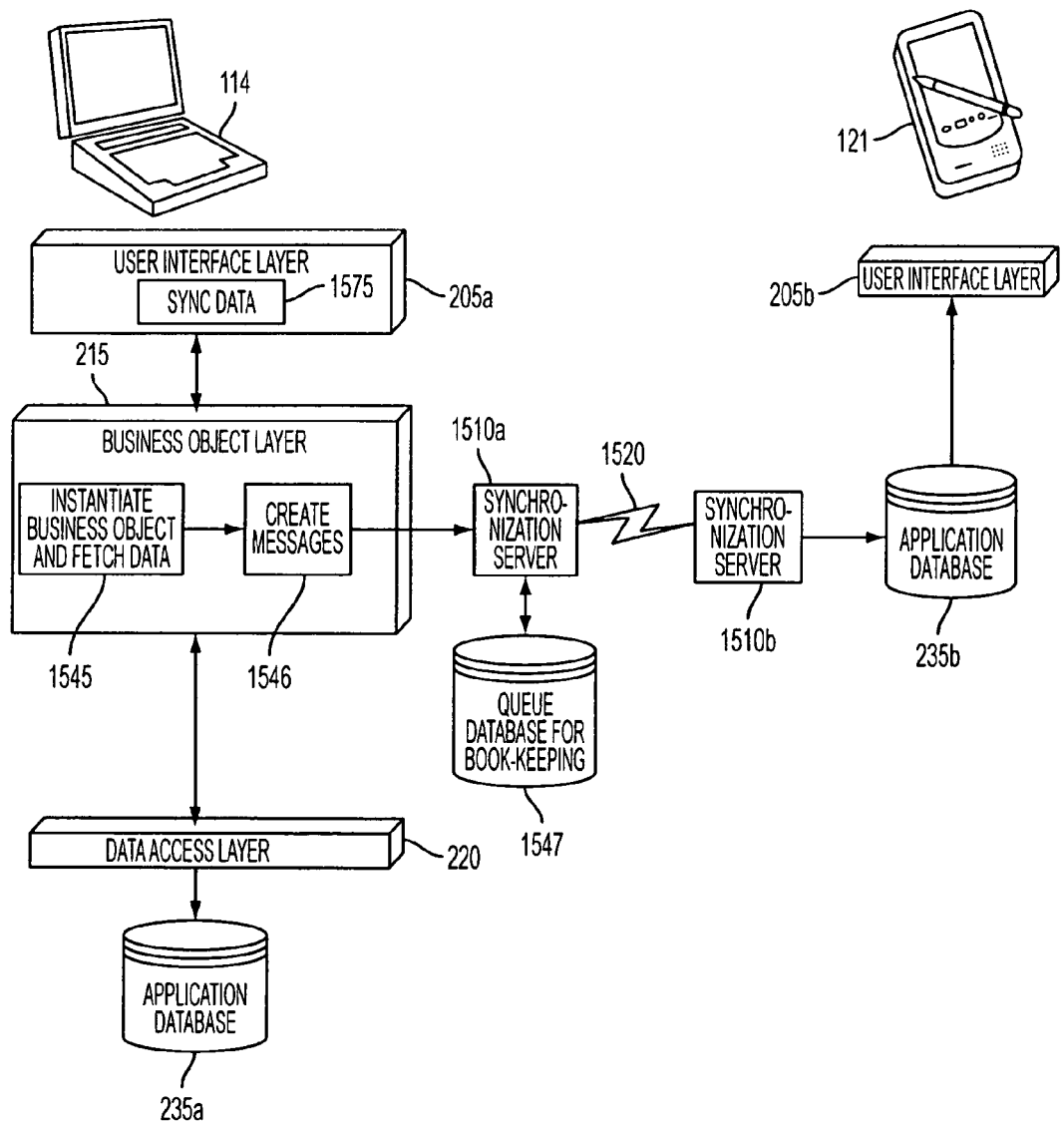
FIG. 15*b* shows a synchronization process from a companion device such as a mobile device to a PDA according to one embodiment of the present invention.

FIG. 15b shows a synchronization process from a companion device such as a mobile device to a PDA according to one embodiment of the present invention. According to one embodiment, the application on the mobile device 114 provides a UI component that allows the user to specify data to be synchronized such as a data range. Upon initiation of this event by the user (1575), the business object layer 215 on the mobile device 114 extracts data from application database 235a as if it were exposing the data to user interface layer 205a and instantiates corresponding business objects (1545). Then, BOL 215 generates messages (1546) via calls to particular API functions in middleware 1520, which are passed to synchronization sever 1510a. These messages are stored in a queue 1547 for database bookkeeping. The messages are passed via middleware 1520 to synchronization server 1510b on companion where they are unpacked. The messages are used to generate corresponding SQL queries, which causes the property data for the business objects to be stored in application database 235b on the companion 121.

Figure 15C:
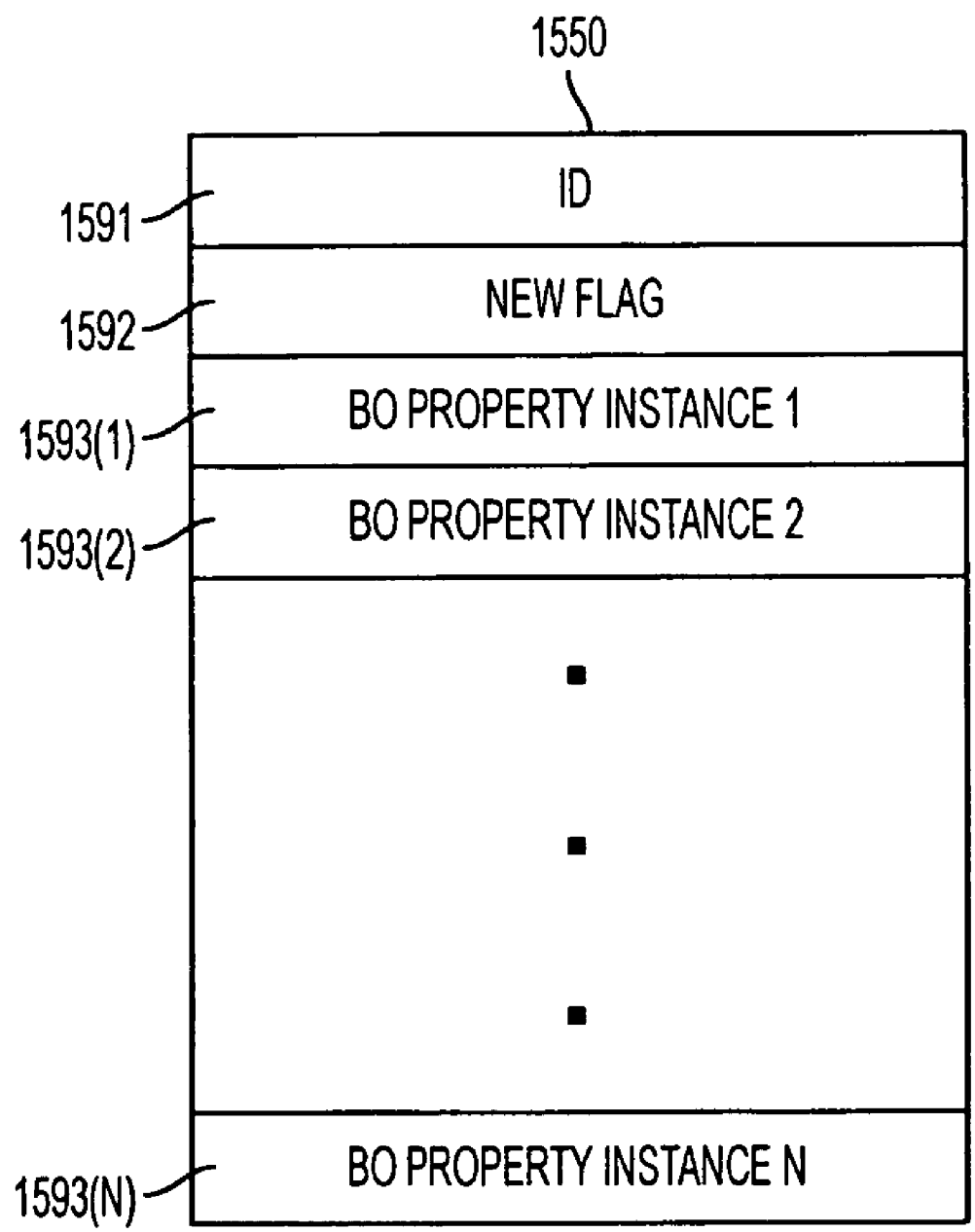
FIG. 15*c* depicts a data structure for a message according to one embodiment of the present invention.

FIG. 15c depicts a data structure for a message according to one embodiment of the present invention. Message 1550 includes ID 1591 storing a unique of a business object 805 that may be generated by an ID generator, New Flag 1592, which is a binary flag indicating whether the business object 805 is new, and BO property instance 1 1593(1) to BO property instance N 1593(N) that store property instance data for the associated business object 805.

What is claimed is:

1. A system for generating a plurality of software applications respectively for a plurality of heterogeneous computing devices, each computing device having different associated capabilities, the system to output device-specific versions of a software application each tailored to the capabilities of an associated computing device in response to receiving device-independent modeling information characterizing the software application, the system comprising:

a framework that defines common services on the computing devices for each of the plurality of software applications;

a plurality of object types, each object type having a functional relationship to the common services provided by the framework;

a modeling tool, wherein the modeling tool provides for device-independent customization of software applications, the modeling tool to receive modeling information defining instances of the plurality of object types as input, and the modeling tool to generate as output a device-independent metadata structure, the metadata structure representing the modeling information and describing behavior and functionality of a software application; and a plurality of device-specific code generators associated respectively with each of the plurality of heterogeneous computing devices, wherein each generator:

receives as input the device-independent metadata structure;

selects at least a portion of the modeling information represented by the metadata structure as a function of the capabilities of the associated computing device; and generates at least one runtime component for the associated computing device as a function of the selected portion of modeling information, said at least one runtime component to extend the common services of the framework to provide the associated computing device with application-specific functionality, the services provided by said at least one runtime component being tailored to the capabilities of the associated computing device;

wherein the services provided for in the runtime components for two different devices generated from the same metadata structure are different, and wherein for each heterogeneous computing device, the framework and at least one runtime component tailored to the capabilities of the device collectively comprise the software application.

2. The system according to claim 1, wherein the framework includes a user interface layer, a business object layer and a data access layer.

3. The system of claim 2, wherein the plurality of object types include an object type associated with the user interface layer of the framework, an object type associated with the business object layer of the framework, and an object type associated with the data access layer of the framework.

4. The system according to claim 1, wherein the heterogeneous computing devices include a mobile device and associated companion device, the mobile device having greater computational power than the companion device.

5. The system of claim 4, the plurality of device-specific code generators including a first code generator associated with the mobile device and a second code generator associated with the companion device, wherein for a first software application, the device-specific code output by the second code generator does not include routines to perform data validation during runtime, whereas the device-specific code output by the first code generator includes routines to validate data on the mobile device if the data is received from the associated companion device.

6. The system of claim 4, the plurality of device-specific code generators including a first code generator associated with the mobile device and a second code generator associated with the companion device, wherein for a first software application, the device-specific code output by the second code generator includes routines to store data entered into the companion device in object form, whereas the device-specific code output by the first code generator includes routines to map the same data, if input into the mobile device, to a relational database.

7. The system of claim 1, wherein the difference in capabilities among the heterogeneous computing devices includes at least one of a difference in processing power, memory capacity, display capability, and input-output capability.

8. The system of claim 1, wherein for each device-specific implementation of the software application, object code of the framework is dynamically linked to said at least one runtime component.

9. The system of claim 1, wherein said at least one runtime component are stored in application runtime files for deployment to the associated computing device for execution.

10. The system of claim 1, wherein the modeling tool is to receive the modeling information as input via a graphical user interface.

11. A system for generating a software application for a plurality of computing devices having heterogeneous capabilities comprising:

a modeling tool for specifying instance information for a plurality of pre-defined object types, the object types having a functional relationship to common services provided by a runtime framework, wherein the modeling tool stores the instance information as a metadata file; and a plurality of application generators, wherein each application generator is associated with one of the plurality of heterogeneous devices, and wherein each generator reads the metadata file and generates at least one runtime component for the associated computing device, said at least one runtime component extending the common services of the framework to provide the associated computing device with application-specific functionality, the services provided by said at least one runtime component being tailored to the capabilities of the associated computing device, wherein the services provided for in the runtime components generated from a same metadata file for two different devices are different, wherein for each computing device, the runtime framework and at least one runtime component tailored to the capabilities of the device are stored in application runtime files which collectively comprise the software application.

12. The system of claim 11, wherein the heterogeneous capabilities among the plurality of computing devices include at least one of a difference in processing power, memory capacity, display capability, and input-output capability.

13. A method for generating a software application for a mobile device and an associated companion device, the mobile device having different capabilities than the companion device including greater computational power, the method comprising:

defining a plurality of object types;

receiving instance information for at least one object type, wherein the instance information includes at least one logical operation, each of the at least one logical operation associated respectively with an object type;

storing device-independent metadata information, the metadata information associated with the instance information for the at least one object type;

defining a first generator process associated with the mobile device and a second generator process associated with the companion device, wherein the first generator process generates at least one first runtime component for the mobile device from the metadata information to provide application specific functionality tailored to the capabilities of the mobile device, and the second generator process generates at least one second runtime component for the companion device from the metadata information to provide application-specific functionality tailored to the capabilities of the companion device, said at least one first runtime component and said at least one second runtime component providing different functionality;

transmitting said at least one first runtime component to the mobile device, the mobile device storing said at least one first runtime component for execution; and transmitting said at least one second runtime component to the companion device, the companion device storing said at least one second runtime component for execution.

14. The method of claim 13, wherein the difference in capabilities further include at least one of a difference in memory capacity, display capability, and input-output capability.

* * * * *